(12) United States Patent
Jain et al.

(10) Patent No.: US 10,938,814 B2
(45) Date of Patent: Mar. 2, 2021

(54) UNIFIED AUTHENTICATION SOFTWARE DEVELOPMENT KIT

(71) Applicant: Aetna Inc., Hartford, CT (US)

(72) Inventors: Salil Kumar Jain, Jackson Heights, NY (US); Abbie Barbir, Ogdensburg, NY (US)

(73) Assignee: Aetna Inc., Hartford, CT (US)

( * ) Notice: Subject to any disclaimer, the term of this patent is extended or adjusted under 35 U.S.C. 154(b) by 127 days.

(21) Appl. No.: 16/025,416

(22) Filed: Jul. 2, 2018

(65) Prior Publication Data

US 2018/0309758 A1 Oct. 25, 2018

Related U.S. Application Data

(63) Continuation-in-part of application No. 15/589,252, filed on May 8, 2017, now Pat. No. 10,541,813.

(60) Provisional application No. 62/333,499, filed on May 9, 2016.

(51) Int. Cl.
| | |
|---|---|
| *H04L 29/06* | (2006.01) |
| *H04L 9/32* | (2006.01) |
| *H04L 29/08* | (2006.01) |
| *G06F 21/45* | (2013.01) |
| *H04L 9/08* | (2006.01) |
| *G06F 21/32* | (2013.01) |

(52) U.S. Cl.
CPC .......... *H04L 63/0884* (2013.01); *G06F 21/32* (2013.01); *G06F 21/45* (2013.01); *H04L 9/0891* (2013.01); *H04L 9/3213* (2013.01); *H04L 9/3226* (2013.01); *H04L 63/0807* (2013.01); *H04L 63/0861* (2013.01); *H04L 63/0876* (2013.01); *H04L 63/205* (2013.01); *H04L 67/2823* (2013.01); *H04L 63/20* (2013.01)

(58) Field of Classification Search
CPC . H04L 63/0884; H04L 9/0891; H04L 9/3213; H04L 9/3226; H04L 63/0807; H04L 63/0861; H04L 63/0876; H04L 63/205; H04L 67/2823; H04L 63/20; G06F 21/32; G06F 21/45

See application file for complete search history.

(56) References Cited

U.S. PATENT DOCUMENTS

| | | |
|---|---|---|
| 7,260,724 B1 | 8/2007 | Dickinson et al. |
| 9,444,824 B1 | 9/2016 | Balazs et al. |
| 2007/0118891 A1 | 5/2007 | Buer |

(Continued)

*Primary Examiner* — Ali S Abyaneh
*Assistant Examiner* — Zoha Piyadehghibi Tafaghodi
(74) *Attorney, Agent, or Firm* — Leydig, Voit & Mayer, Ltd.

(57) ABSTRACT

Embodiments of the disclosure provide a method of incorporating multiple authentication systems and protocols. The types of authentication systems and protocols can vary based on desired assurance levels. A Centralized Authentication System together with an authentication policy dictates acceptable authentication systems. Authorization data for each authorization system are captured and packaged into a single Object Data Structure. The authorization data can be compared to data stored in an identity store for authentication. The authorization data can also be used for user and device registration and for transferring an authentication or registration token from a previously authenticated and registered device to a new device.

20 Claims, 18 Drawing Sheets

(56) References Cited

U.S. PATENT DOCUMENTS

| | | |
|---|---|---|
| 2009/0097661 A1 | 4/2009 | Orsini et al. |
| 2009/0271847 A1 | 10/2009 | Karjala et al. |
| 2009/0292927 A1 | 11/2009 | Wenzel et al. |
| 2012/0198535 A1* | 8/2012 | Oberheide .......... H04L 63/0272 726/9 |
| 2013/0086669 A1* | 4/2013 | Sondhi .................... G06F 21/41 726/8 |
| 2013/0311660 A1* | 11/2013 | Dabbiere ................ H04L 29/08 709/225 |
| 2014/0208394 A1 | 7/2014 | Goodwin |
| 2015/0026785 A1 | 1/2015 | Soon-Shiong |
| 2015/0095975 A1* | 4/2015 | Barton ................ G06F 9/45533 726/1 |
| 2015/0128240 A1 | 5/2015 | Richards et al. |
| 2015/0137938 A1 | 5/2015 | Slaby et al. |
| 2015/0278245 A1* | 10/2015 | Sagar .................... G06F 16/178 707/610 |
| 2016/0134596 A1* | 5/2016 | Kovacs ............... G06F 21/6281 726/7 |
| 2016/0140550 A1 | 5/2016 | Keys |
| 2016/0379220 A1* | 12/2016 | Tunnell ................ H04W 12/06 705/71 |
| 2017/0289140 A1* | 10/2017 | Cai .................... H04L 63/0838 |
| 2018/0077143 A1* | 3/2018 | Sridharan ........... H04L 63/0884 |

\* cited by examiner

UNIFIED AUTHENTICATION SOFTWARE DEVELOPMENT KIT

CROSS REFERENCE TO RELATED APPLICATIONS

This patent application is a continuation-in-part of U.S. patent application Ser. No. 15/589,252, filed on May 8, 2017, now U.S. Pat. No. 10,541,813 which claims the benefit of U.S. Provisional Patent Application No. 62/333,499, filed on May 9, 2016, all of which are incorporated by reference.

BACKGROUND

Consumers access websites to review numerous types of information and utilize various types of services. For example, consumers may log into a health care organization website in order to view available products, apply for products, or utilize one of many services offered by the health care organization. Increasingly, consumers not only access these and other websites with personal computers, but also access internet-based applications using smart phones and other electronic devices. In order to provide data security for sensitive information, websites must employ a secure authentication system that can accommodate a range of consumer electronic devices.

Registration, authentication, and de-registration are three parts of the majority of authentication systems. Generally, these three parts become more cumbersome for consumers as the desired security level increases. However, increased security is not necessary for every consumer or application, although websites generally employ authentication systems.

BRIEF SUMMARY

Embodiments of the disclosure provide a method of incorporating multiple authentication systems and protocols. The types of authentication systems and protocols can vary based on desired assurance levels. A Centralized Authentication System together with an authentication policy may dictate acceptable authentication systems. Authorization data for each authorization system may be captured and packaged into a single Object Data Structure. The authorization data can be compared to data stored in an identity store for authentication. The authorization data may also be used for user and user device registration and for transferring an authentication or registration token from a previously authenticated and registered user device to a new user device.

Additional embodiments of the disclosure provide a user device communicatively coupled to a server providing remote user service functions. The user device includes an input device for providing user data to the user device, a processor, and a memory. The memory stores instructions that when executed cause the processor to: initiate a user service function; call an application Software Development Kit (SDK) configured to perform the user service function; call a vendor SDK implementing an authentication protocol from the application SDK over a unified interface formed between the vendor SDK and the application SDK; receive vendor data related to the user service function from the vendor SDK at the application SDK over the unified interface; construct, by the application SDK, the vendor data into application data relevant to the user service function and readable by an Application Programming Interface (API) at the server; and send the application data to the server.

Yet further embodiments provide a method of performing user service functions at a user device communicatively coupled to a server implementing the user service functions. The method includes: initiating a user service function; calling an application Software Development Kit (SDK) configured to perform the user service function; calling a vendor SDK implementing an authentication protocol from the application SDK over a unified interface formed between the vendor SDK and the application SDK; receiving vendor data related to the user service function from the vendor SDK at the application SDK over the unified interface; constructing, by the application SDK, the vendor data into application data relevant to the user service function and readable by an Application Programming Interface (API) at the server; and sending the application data to the server.

BRIEF DESCRIPTION OF THE SEVERAL VIEWS OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the disclosure describe a method and system for incorporating multiple authentication systems and protocols in conjunction. The system allows one or more authentication systems to be utilized as a means for a client to be authenticated based on a desired assurance level. Authentication can be on either the server side or user device side.

Figure 1:
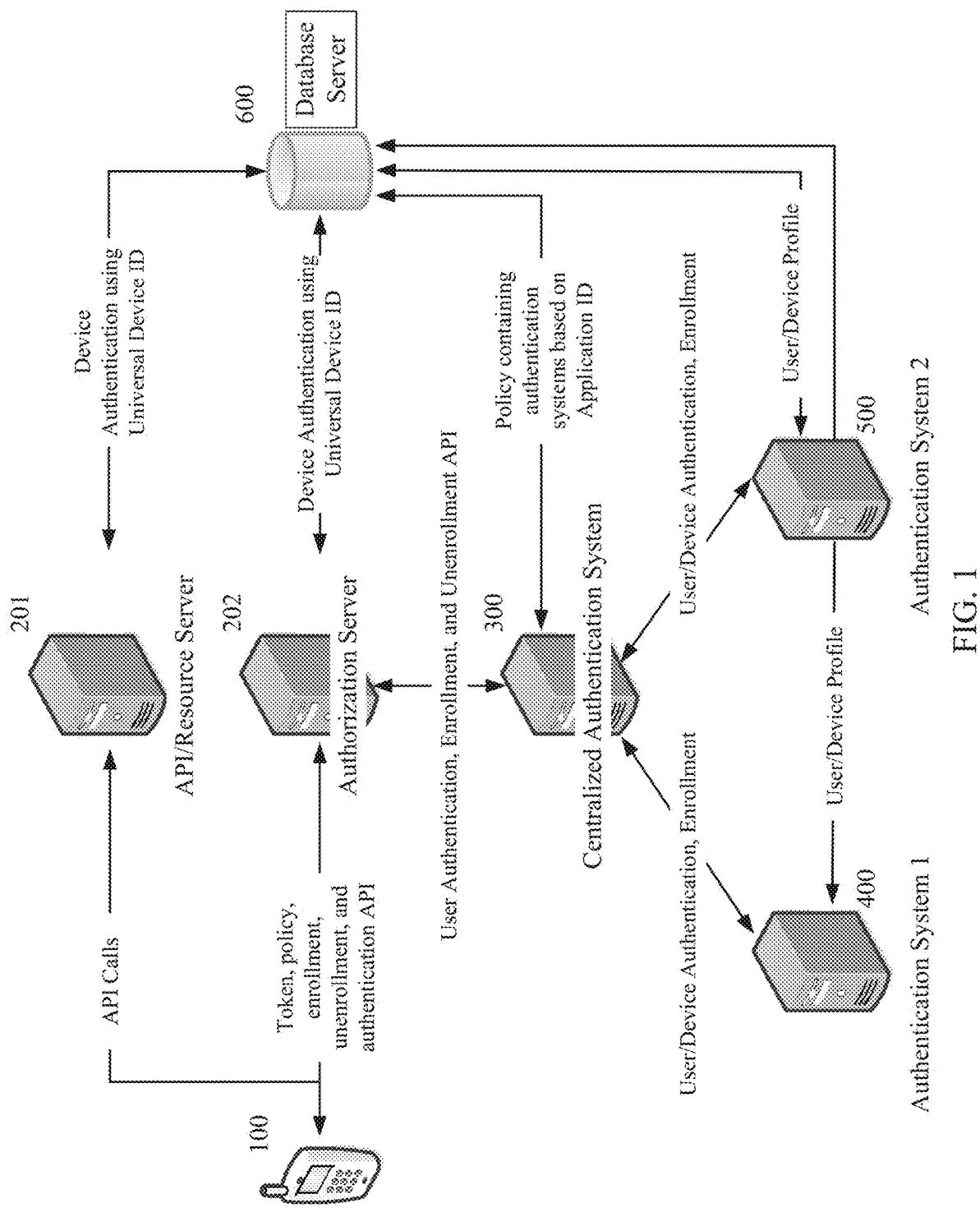
FIG. 1 schematically illustrates a network architecture, in accordance with a first exemplary embodiment of the disclosure.
Figure 2:
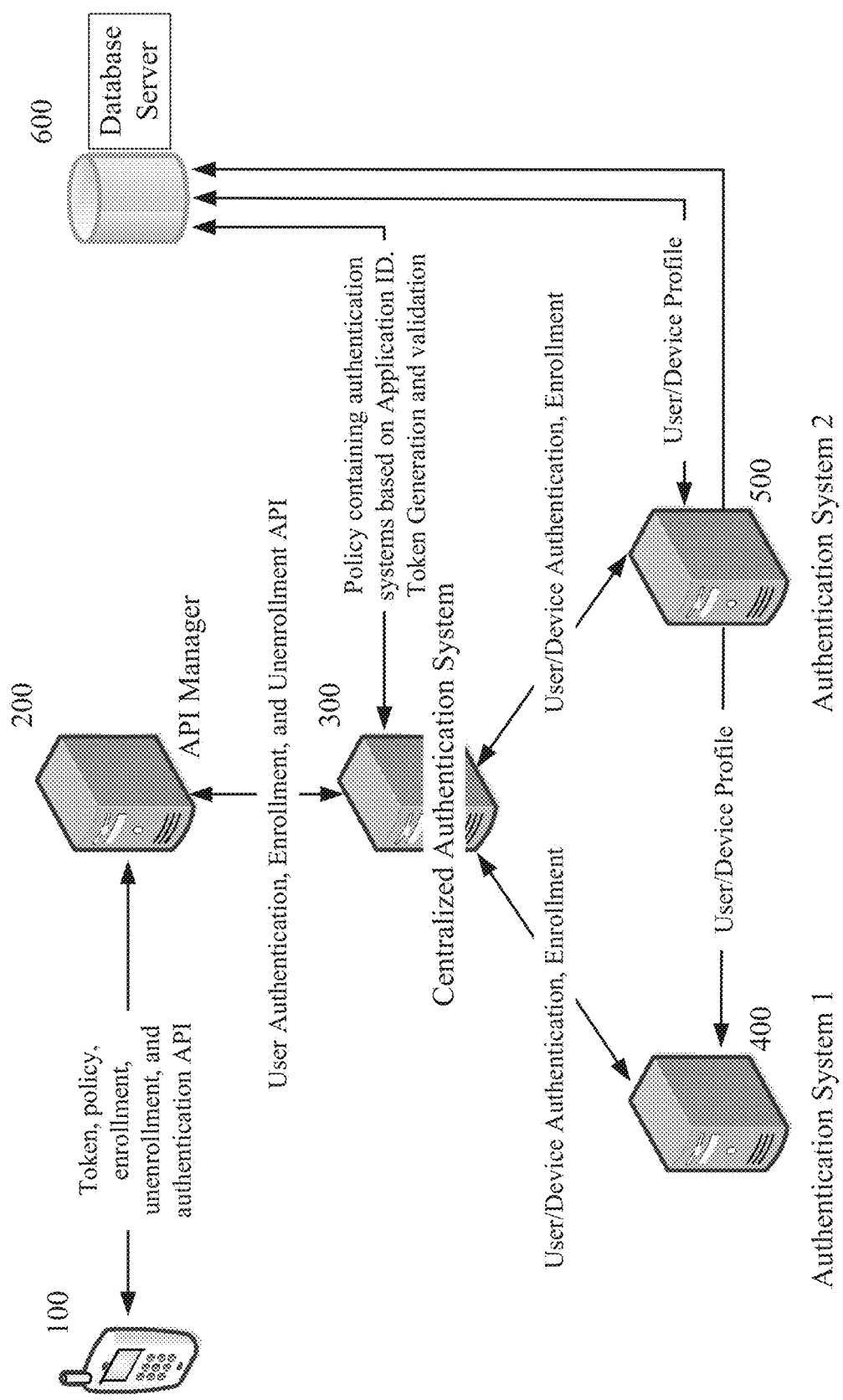
FIG. 2 schematically illustrates a network architecture, in accordance with a second exemplary embodiment of the disclosure.
Figure 3:
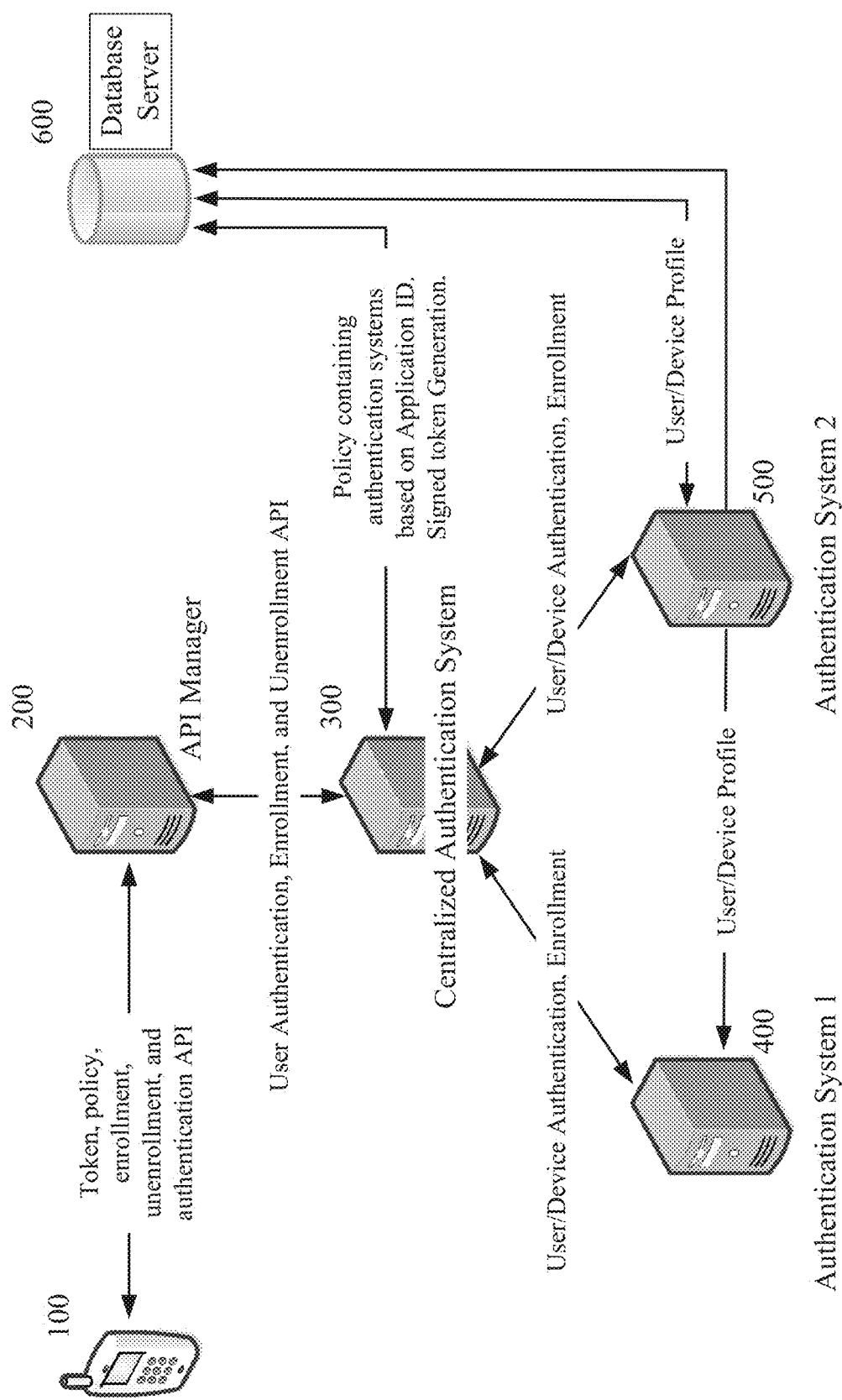
FIG. 3 schematically illustrates a network architecture, in accordance with a third exemplary embodiment of the disclosure.

FIGS. 1, 2, and 3 illustrate exemplary embodiments of network architectures for providing user device and user authentications. Network architecture embodiments may include a user device 100, a Centralized Authentication System 300, a first Authentication system 400 (Authentication System 1), a second Authentication system 500 (Authentication System 2), and a Database Server 600. An embodiment of the network architecture may further comprise an API/Resource server 201 and an Authorization Server 202. Another embodiment of the network architecture may furtherer comprise an API Manager 200.

The Centralized Authentication System, which communicates with the authentication systems, such as Authentication System 1 and Authentication System 2. Each of these systems communicates with the Database Server to validate the authentication data provided from the user device. Based on this validation, the user device may or may not be authorized to access the application.

In certain embodiments, the authentication policy varies based on the application the user is requesting access to. Successful authentication allows access to the application via the user device.

It will be understood by a person of skill in the art that FIGS. 1, 2, and 3 are exemplary embodiments of an environment in which the method is used. For example, FIGS. 1, 2, and 3 show embodiments with a separate server for each authentication system (Authentication System 1 and Authentication System 2), but in another embodiment a single server may combine several authentication systems. Accordingly, the illustrations of FIGS. 1, 2, and 3 are not meant to limit the types of network architecture in which the method can be used.

Figure 4:
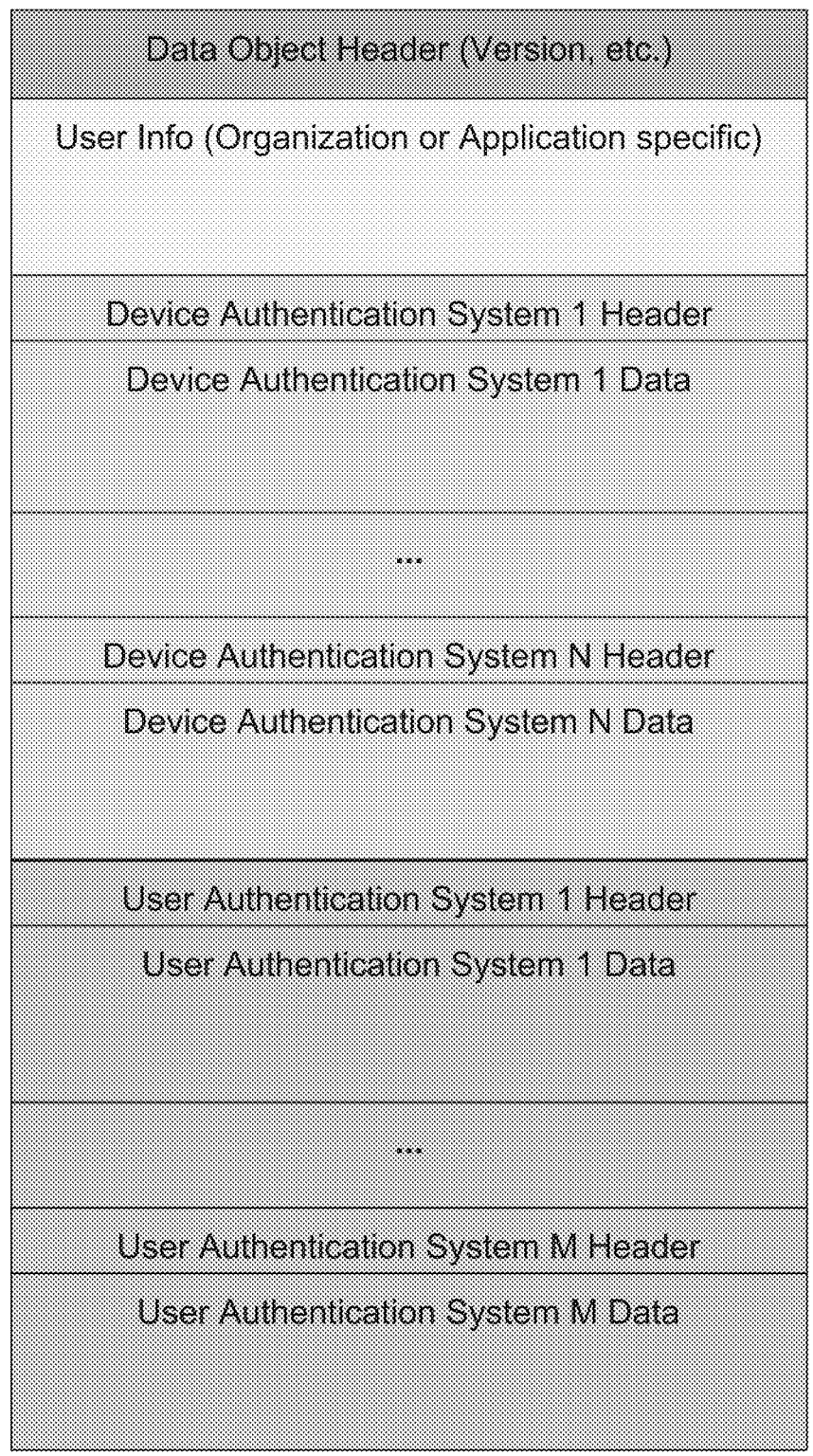
FIG. 4 illustrates an Object Data Structure, in accordance with an embodiment of the disclosure.

FIG. 4 shows an exemplary embodiment of the Object Data Structure used to store user and device data pertaining to multiple authentication systems. Such an Object Data Structure may utilized in any of the Network Architectures of FIGS. 1, 2, and 3. The Object Data Structure typically includes at least three general types of information. The first type of information is the Data Object Header, which contains information pertaining to the network architecture, version numbers, and/or any other information useful to achieve the object of the method. The second type of information in the Object Data Structure is the User Information. The User Information contains information specific to a user, such as a user name or user ID. The information can be specific to the type of organization or application. The third type of information the Object Data Structure contains pertains to user and user device authentication systems.

In certain embodiments, the Object Data structure is organized in an extensible format. As such, any number of authentication systems can be supported by the Object Data Structure based on how the system is being utilized.

In an embodiment, a header and authentication data are provided for each authentication system. The header contains data that identifies the type of a particular authentication system. The authentication data contains data for verifying the user or user device. For example, the header may specify that the authentication system employs password authentication, and the authentication data specifies the user's password. In an embodiment, the Object Data Structure contains a set of header and authentication data for each user authentication system and for each user device authentication system.

In one embodiment, the Object Data Structure is stored in computer readable memory of the user device. The Object Data Structure can then be intermittently updated on the user device. For example, software on the user device side may automatically update the stored Object Data Structure after certain time periods and/or after certain user behavior. In another embodiment, the Object Data Structure is created if certain conditions are met. For example, the Object Data Structure can be automatically generated when the user seeks authorization from the Authorization Server or shortly before.

The invention is not limited to any specific authentication system or any combination of authentication systems. For example, authentication systems may be based on voice recognition, facial recognition, biometrics including fingerprint and retinal scanners, universal serial bus (USB) security tokens, near field communication (NFC), Fast Identity Online (FIDO) Alliance specifications, and so forth. It will be understood by a person of skill in the art, that an authentication system is not limited to any particular mechanism. For example, in an embodiment, one authentication system may simply capture general information pertaining to the user device's geographical location. Embodiments may vary authentication systems according to the desired assurance level and logistics of the network architecture.

Not every authentication system supported in the Object Data Structure has to be used for each user authentication attempt. For instance, a particular user device being utilized to authenticate a user may only be able to provide inputs satisfying a subset of the authentication system data stored in the Object Data Structure. In this situation, the system may allow authorization of the user based on receiving positive input regarding only the subset of authentication system data. In this regard, the Object Data Structure allows the system to select authentication systems to use for the authorization attempt based on what authentication systems are supported by the user device the user is attempting to gain access over.

The authentication systems may be selected or removed in a modular fashion. Typically, the authentication systems are added or removed at the enterprise level. This allows the Centralized Authentication System to remove authentication systems with data stored in the Object Data Structure that are no longer useful for authenticating a user. To know when certain data is no longer useful, the Centralized Authentication System may keep data collected from the user device regarding a usage rate of the authentication system and a failure rate of a particular authentication system.

Regarding the usage rate data, the Centralized Authentication System can determine whether a particular authentication system is not being used or is redundant by looking for authentication systems with low usage. These low usage authentication systems can then be optionally removed from the system. Additionally, by reviewing the usage rate data coupled with a cost for the authentication system, a determination of a cost per authentication transaction can be made. The cost per authentication data can be used to determine whether a particular authentication system is high cost, and if so, can that high cost be mitigated by migrating certain authentication requests to a different lower cost authentication system. Cost, as discussed in the context of usage rate data, may include one or more of a financial cost, a computational or resource cost, and/or any other type of system constraint resulting from the use of a particular authentication system.

By reviewing the failure rate data, the Centralized Authentication System can determine whether one particular authentication system is either not working or not useful. This determination is used to decide whether to remove the non-working authentication system. For example, fingerprint readers are generally required if fingerprint data is to be used for authentication. However, not all fingerprint readers are of the same quality. Accordingly, fingerprint readers that do not provide a reading of a quality high enough for the system to be confident in the reading can be removed.

Additionally, the data stored in the Object Data Structure can be updated in order to overcome problems with attribute change of the authentication data. Attribute change is monitored against an attribute score that shows a confidence in that attribute. Once the change when compared with the score reflects that confidence in the authentication system is too low, then the attribute data required for a particular authentication system is collected again, i.e., reenrollment.

A score may be set by the authentication system, where the score represents a minimum confidence that the authentication system can achieve and still authorize a user. Accordingly, when the attribute data of the authentication system drops below the score, then the data will need to be collected again such that the authentication system can be used again. Prior to the data being collected, the particular affected authentication system may not be utilized.

Examples of attribute change may include a user's residence or fingerprint data. If a user moves to a new residence, location data used to provide an indication of authentication can be updated to reflect the user's new residence. Another example would be a changed fingerprint. A user's fingerprint may change over time due to injury, and as a result, the user may choose to register a fingerprint from a different finger for future authentication. Accordingly, the fingerprint data stored will be updated over time to reflect any changes such that the fingerprint data collected at the time of authentication reflects a high confidence that the user is who they say they are.

In certain embodiments, the Object Data Structure will store data specific to how a user uses a particular user device. For instance, the Object Data Structure may store locations where the user uses a particular user device. The Object Data Structure may also store data related to how fast a user walks, where the user travels while using a particular user device, or swipe patterns for a user device with a touch sensitive display. This user specific data is then utilized by the system to verify a user such that a re-authentication does not have to take place once the user has been previously authenticated during a session.

Figure 5:
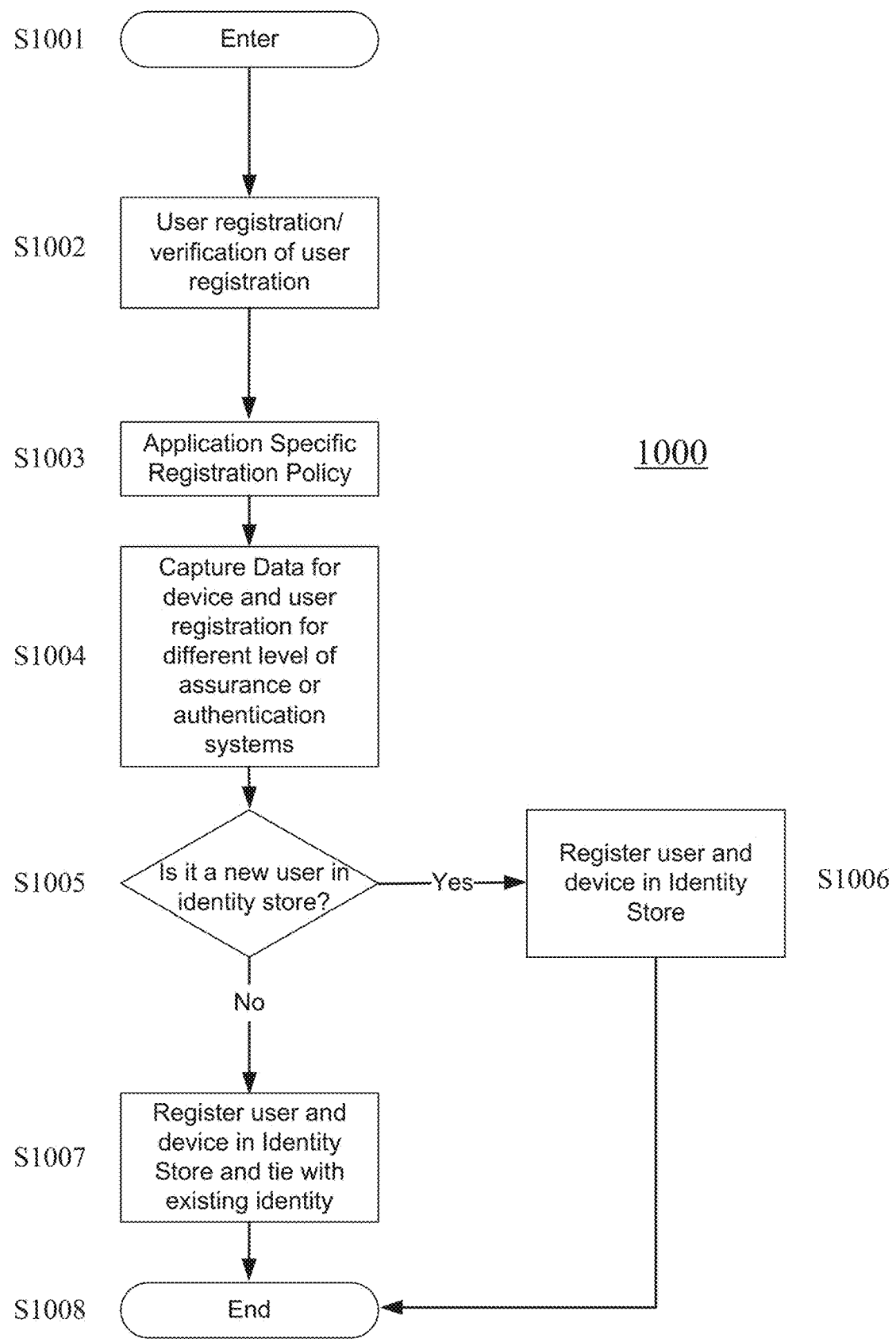
FIG. 5 illustrates a flowchart showing registration of a user and user device, in accordance with an embodiment of the disclosure.

FIG. 5 provides a flowchart showing how the Object Data Structure can be used for registration of a user and/or user device. A registration policy dictates the conditions necessary to register a user and/or user device. In an embodiment, the registration policy is specific to an application, and user registration is specific to an organization or application.

When a user seeks registration, the Centralized Authentication System calls the Capture Data Protocol and attempts to retrieve information within the Object Data Structure associated with the user. The amount and type of information can vary based on the desired level of assurance or authentication system. The Centralized Authentication System examines the User Info in the Object Data Structure and determines whether the user identified in the User Info is a new user in an Identity Store.

If it is determined that the user is a new user in the Identity Store, the Centralized Authentication System proceeds to register the user and user device in the Identity Store. If it is determined that the user is not a new user in the Identity Store, the Centralized Authentication System registers and associates the user and user device with an existing identity in the Identity Store.

The embodiment of the method illustrated in FIG. 5 comprises the following steps. User registration/verification of user registration S1002. Application Specific Registration Policy S1003. Capture Data for device and user registration for different level of assurance or authentication systems S1004. Determining whether it is a new user in identity store S1005. If yes, register user and device in Identity Store S1006. If no, register user and device in Identity Store and tie (i.e., associated) with existing identity S1007.

When a user seeks registration, the embodiment of the method starts with a user registration process, or in the case that the user has been registered, verification of the user registration S1002. Then, an application specific registration policy is implemented S1003. To capture data for device and user registration, the Centralized Authentication System calls the Capture Data Protocol and attempts to retrieve information within the Object Data Structure associated with the user S1004. Then it is determined whether the user is a new user in the Identity Store S1005. If so, the user and device are registered in the Identity Store S1006. If not, then the user and device in the Identity Store are registered and tied (i.e., associated with) with an existing identity in the Identity Store S1007.

Figure 9:
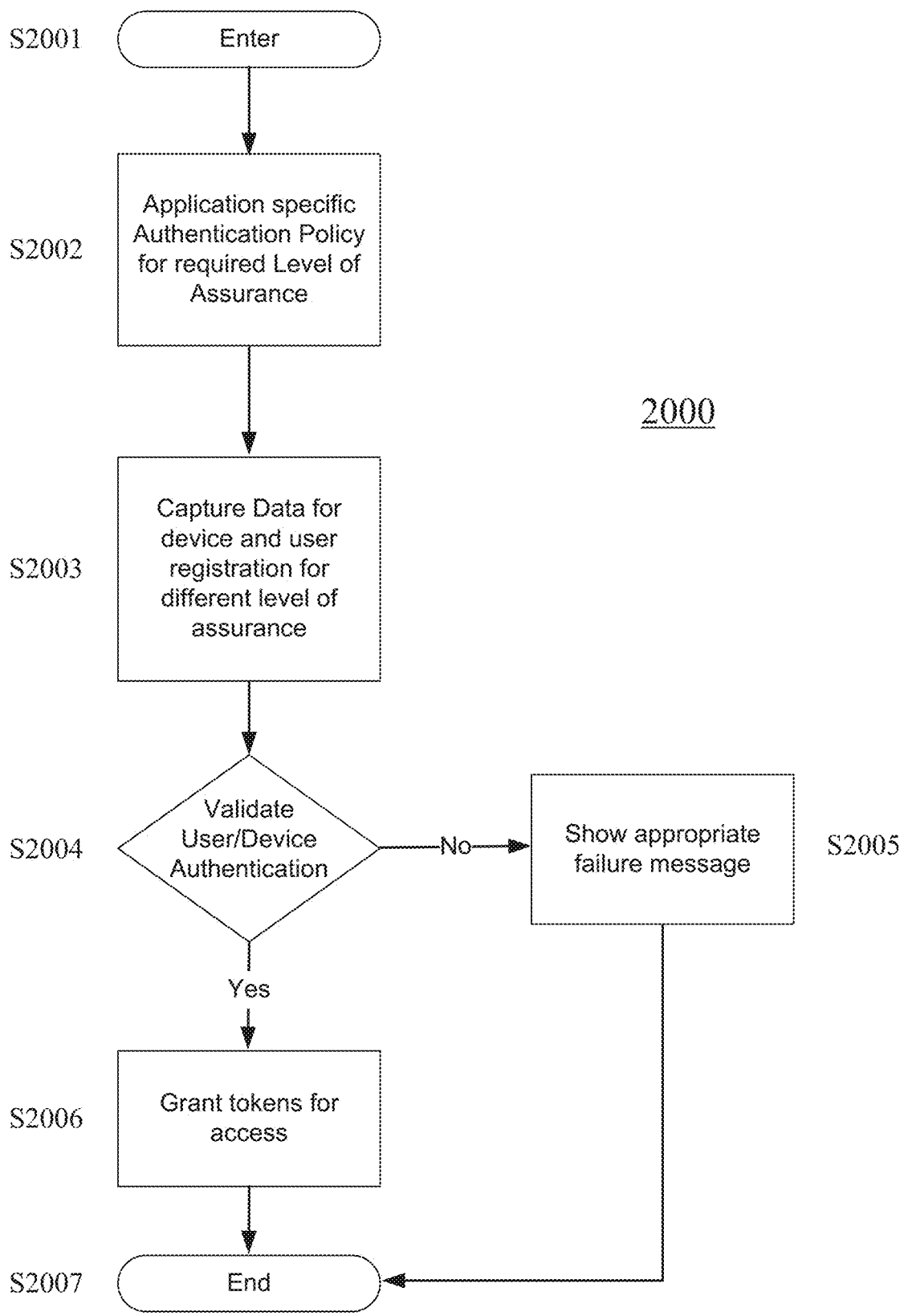
FIG. 9 is a flowchart showing authentication of a user and user device, in accordance with an embodiment of the disclosure.

FIG. 9 provides a flowchart showing how the Object Data Structure can be used for authentication. When a user seeks authorization access to a particular application, the request is routed to the Centralized Authentication System and an authentication policy is used to validate the user's credentials. The authentication policy dictates what types of authentication systems are acceptable for a successful authentication and can vary based on the desired level of assurance.

FIG. 9 provides a flowchart showing how the Object Data Structure can be used for authentication according to an embodiment, which may be implemented in the network architectures shown in FIGS. 1, 2, and 3.

The embodiment illustrated in FIG. 9 starts with implementing the application specific authentication policy for the required level of assurance S2002. Then data for the device and user registration are captured for a different level of assurance S2003. Then it is determined whether the user and/or device authentication is validated S2004. If the user and/or user device authentication is not validated, an appropriate failure message is shown S2005. If the user and/or user device authentication is verified, then tokens for access are granted S2006.

The Centralized Authentication System calls the Capture Data Protocol and retrieves the Object Data Structure associated with the user seeking authorization. Then, the Centralized Authentication System examines the Object Data Structure. Depending on the Authentication policy and desired level of assurance, the Centralized Authentication System examines data for user authentication and/or user device authentication. In an embodiment, the Centralized Authentication System examines data for both user authentication and user device authentication.

The Centralized Authentication System examines the header and data for one or more authentication systems according to the authentication policy and desired level of assurance S2002. The Centralized Authentication System examines the Object Data Structure to determine user information and examines the headers of each set of user device and user authentication systems S2003. The Centralized Authentication System may analyze the Object Data Structure for only one authentication system, a pre-determined combination of authentication systems, several pre-determined combinations of authentication systems, or all authentication systems within the Object Data Structure. In an embodiment, the Centralized Authentication System calls a plurality of authentication servers to vet data of each authentication system in the Object Data Structure. Each authentication server will compare authentication system data to data stored in a corresponding Identity Store S2004.

If the Centralized Authentication System determines that authentication is successful, it grants a token with assurance levels based on various authentications performed and passes the successful authentication to the Authorization Server or API manager S2006. A token may be validated by a validation API or the signing of the token. If the Centralized Authentication System determines that authentication is not successful, an appropriate failure message is shown to the user S2005.

Figure 8:
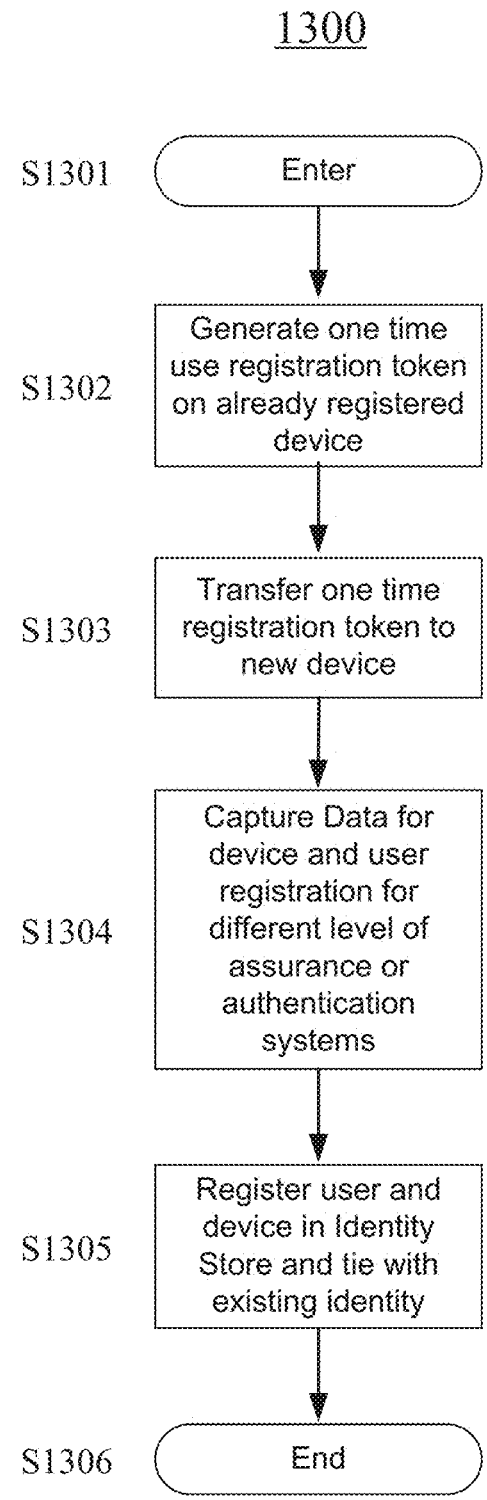
FIG. 8 is a flowchart showing transfer of registration from an already registered user device to a new user device, in accordance with an embodiment of the disclosure.

FIG. 8 provides a flowchart showing how the Object Data Structure can be used for passing user level registration information from a previously registered user device to a new user device, which can then be registered in the Identity Store and associated with the user.

As shown in FIG. 8, when a user requests a transfer S1301, the Centralized Authentication System generates a one-time use registration token on the previously-registered user device S1302 and transfers the one time registration token to the new user device 1303. The Centralized Authentication System calls the Capture Data Protocol and retrieves the Object Data Structure S1304. Depending on the desired level of assurance, the Centralized Authentication System may retrieve the Object Data Structure for only one authentication system, a pre-determined combination of authentication systems, several pre-determined combinations of authentication systems, or all authentication systems within the Object Data Structure. Finally, using the one time registration token with the Object Data Structure, the Centralized Authentication System proceeds to register the user and user device in the Identity Store and associates the user and user device with an existing identity in the Identity Store S1305.

Example 1

A first exemplary embodiment demonstrates how the Object Data Structure shown in FIG. 4 may be used by a health insurance company for authentication. The insurance company may employ a network architecture as shown in FIG. 1, which allows consumers to access health insurance services.

FIG. 1 illustrates a network architecture for providing user device and user authentication according to a first exemplary embodiment. As shown in FIG. 1, a user device requests authorization for access to an application. The authorization is communicated to an Authorization Server 202, which in turn communicates with the Centralized Authentication System 300 and an authentication policy to validate the user's credentials by utilizing a variety of authentication systems (Authentication System 1 (400) and Authentication System 2 (500)). The authentication policy defines an appropriate Identity Store and the types of authentication systems that are acceptable for a successful authentication.

In the first exemplary embodiment, the Identity Store and the data supporting the authentication policy along with user data pertinent to the authentication systems are stored in a Database Server 600. In the first exemplary embodiment, this data is accessed by each of Authentication System 1, Authentication System 2, the Centralized Authentication System, the Authorization Server and the API/Resource Server 201. Utilizing this data, the system can make determinations on user authorization to access certain applications and services. Successful authentication is passed to the Authorization Server to allow access to the application via the user device.

In the first exemplary embodiment, for registration, the user is identified as a member of the health insurance organization. Member identification may be associated with personally identifiable information (PII) data such as first name, last name, zip code, date of birth, and other data elements like SSN, but member identification information is not restricted to this combination. Identification verification may also be implemented using username password or any other established authentication mechanism.

Figure 6:
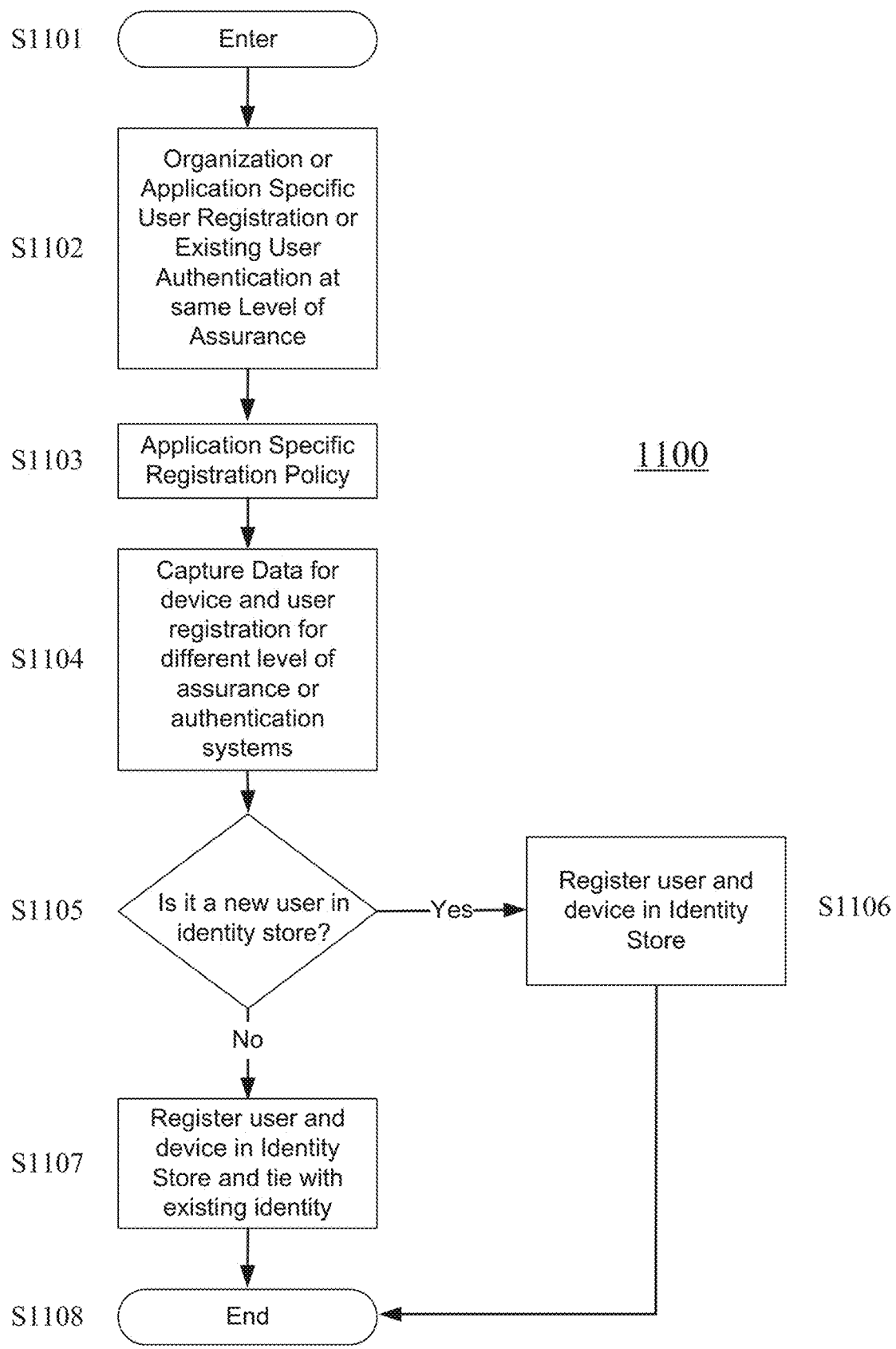
FIG. 6 illustrates a flowchart showing registration of a user and user device, in accordance with the first and the second exemplary embodiments of the disclosure.

A registration process according to the first exemplary embodiment is illustrated in FIG. 6. Organization or Application Specific User Registration or Existing User Authentication at same Level of Assurance S1102. Application Specific Registration Policy S1103. Capture Data for device and user registration for different level of assurance or authentication systems S1104. Determining whether it is a new user in identity store S1105. If yes, register user and device in Identity Store S1106. If no, register user and device in Identity Store and tie (i.e., associated) with existing identity S1107.

When a user seeks registration according to the first exemplary embodiment, the process starts with an organization or application specific user registration, or the provision of a user authentication at the level of assurance required by the organization or application/s user registration S1102. Then, an application specific registration policy is implemented S1103. To capture data for device and user registration, the Centralized Authentication System calls the Capture Data Protocol and attempts to retrieve information within the Object Data Structure associated with the user S1104. Then it is determined whether the user is a new user in the Identity Store S1105. If so, the user and device are registered in the Identity Store S1106. If not, then the user and device in the Identity Store are registered and tied (i.e., associated with) with an existing identity in the Identity Store S1107.

In the first exemplary embodiment, when a user device attempts authentication, the API/Resource Server receives API calls from the user device that is attempting the user authorization. In turn, the API/Resource Server determines what type of authentication system the user device is using to attempt authorization and pulls the relevant data from the Database Server. At the same time, the user device communicates with the Authorization Server in order to begin the authorization.

When the Authorization Server receives requests from consumers seeking access to an application containing sensitive information, and it grants or denies requests based on its authorization policy. The Authorization Server accesses the Centralized Authentication System, which communicates with the authentication systems, such as Authentication System 1 and Authentication System 2. Each of these systems communicates with the Database Server to validate the authentication data provided from the user device. Based on this validation, the user device may or may not be authorized to access the application.

The user device also communicates with the Authorization Sever during enrollment of the user device within the system. For instance, if one of the authentication systems used is password protection, when the user sets up access to the system initially, the password is provided from the user device to the Authorization Server, which in turn records the password and indicates that password protection is a known system for authenticating this user device. This process is repeated for each authentication system utilized to grant access to the user device according to the authentication policy.

When a user seeks access, the Authorization Server begins by verifying the user's identity. The Authorization Server routes the request to the Centralized Authentication System, which then begins the authentication process according to an authentication policy to validate the user's credentials.

Figure 10:
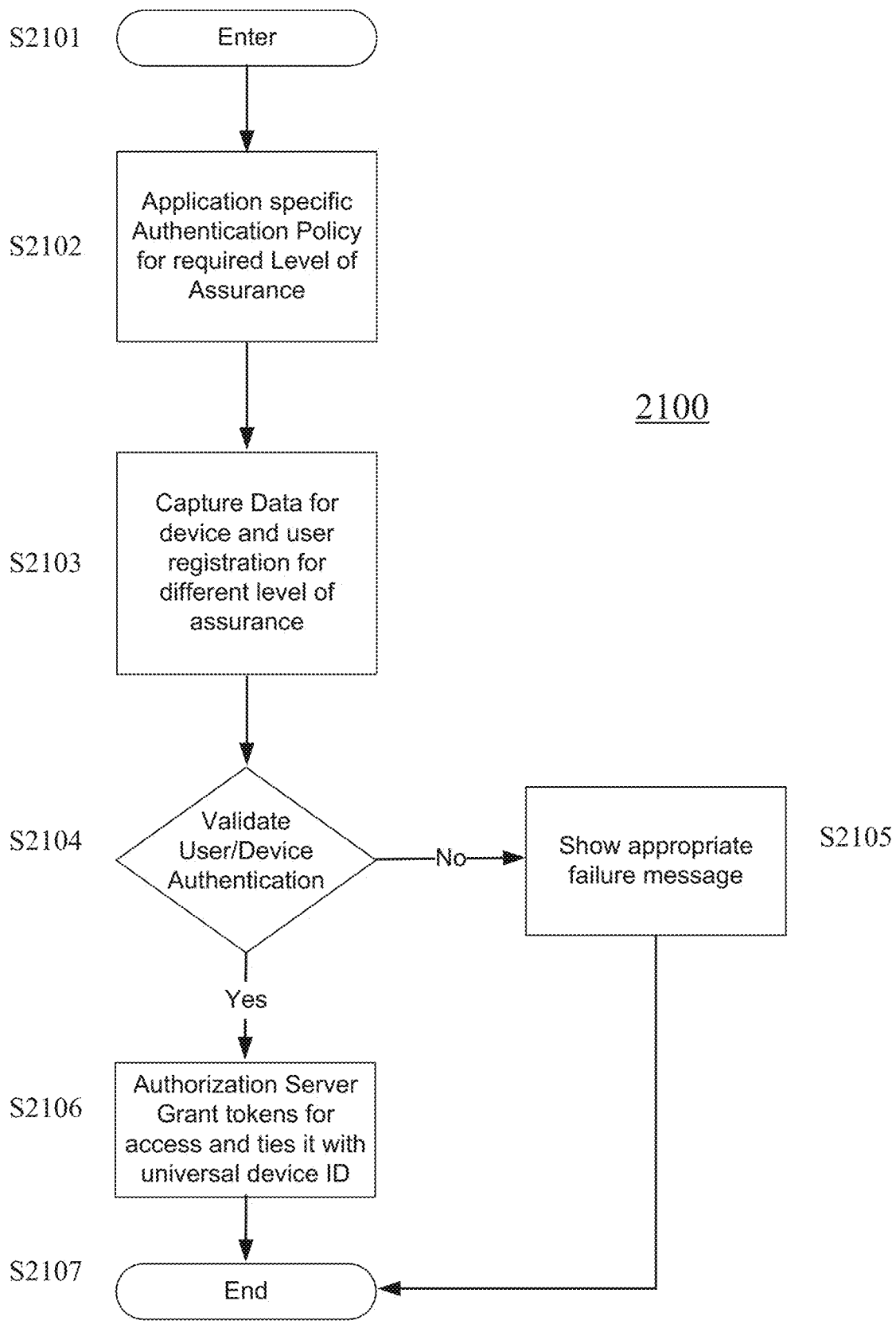
FIG. 10 is a flowchart showing authentication of a user and user device, in accordance with the first exemplary embodiment of the disclosure.

FIG. 10 provides a flowchart showing how the Object Data Structure can be used for authentication according to a first exemplary embodiment, as implemented in the network architecture shown in FIG. 1.

The embodiment of the method illustrated in FIG. 10 comprises the following steps. Application specific Authentication Policy for required Level of Assurance S2102. Capture Data for device and user registration for different level of assurance S2103. Validate User/Device Authentication S2104. If User/Device Authentication validation is unsuccessful, Show appropriate failure message 2105. If User/Device Authentication validation is successful, Authorization Server grants tokens for access and ties it with universal device ID S2107.

When a user seeks authorization access to a particular application, the application's Authorization Server routes the request to the Centralized Authentication System and an authentication policy to validate the user's credentials. The authentication policy dictates what types of authentication systems are acceptable for a successful authentication and can vary based on the desired level of assurance S2102. The Centralized Authentication System examines the Object Data Structure to determine user information and examines the headers of each set of user device and user authentication systems S2103.

The Centralized Authentication System may, for example, recognize three authentication systems that collectively satisfy a desired assurance level: (1) a password; (2) a geographic location of the user; and (3) a day of week. The Centralized Authentication System then routes the user device authentication system data of each authentication system to a corresponding authentication server, as illustrated in FIG. 1. Each authentication server compares the data to data stored in an Identity Store, and reports the results back to the Centralized Authentication System S2104. If each authentication server indicates a successful identification and satisfies the authentication policy, the Centralized Authentication Server grants a token and passes the successful authentication to the Authorization Server S2106. If any of the authentication serves fails to indicate a successful identification, thus failing the authentication policy, an appropriate failure message is displayed S2105.

Example 2

In a second exemplary embodiment Centralized Authentication System 300 is exposed through API manager 200, as shown in FIG. 2, and the Centralized Authentication System grants tokens which can be validated. A token may be validated by a validation API or signing of the token. These tokens may be translated to other token formats such as OAuth, SiteMinder or may be used as is to provide access.

In the second exemplary embodiment, registration is performed as illustrated in FIG. 6, as described above.

Figure 11:
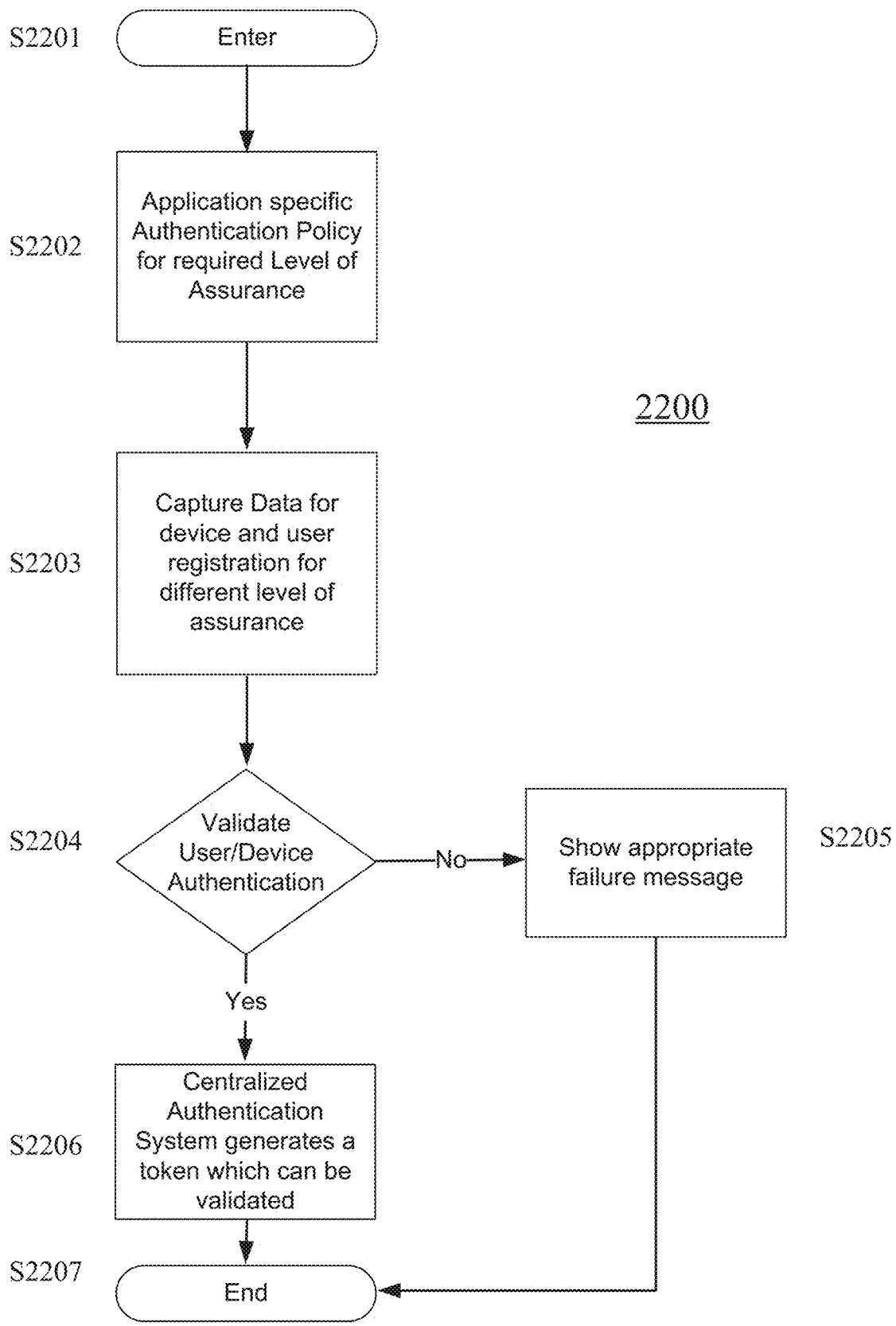
FIG. 11 is a flowchart showing authentication of a user and user device, in accordance with the second exemplary embodiment of the disclosure.

In the second exemplary embodiment, authorization is performed as illustrated in FIG. 11. The embodiment of the method illustrated in FIG. 11 comprises the following steps. Application specific Authentication Policy for required Level of Assurance S2202. Capture Data for device and user registration for different level of assurance S2203. Validate User/Device Authentication S2204. If User/Device Authentication validation is unsuccessful, Show appropriate failure message 2205. If User/Device Authentication validation is successful, Centralized Authentication System generates a token which can be validated S2206.

When a user seeks authorization access to a particular application, the application's Authorization Server routes the request to the Centralized Authentication System and an authentication policy to validate the user's credentials. The authentication policy dictates what types of authentication systems are acceptable for a successful authentication and can vary based on the desired level of assurance S2202. The Centralized Authentication System examines the Object Data Structure to determine user information and examines the headers of each set of user device and user authentication systems S2203.

The Centralized Authentication System then routes the user device authentication system data of each authentication system to a corresponding authentication server, as illustrated in FIG. 2. Each authentication server compares the data to data stored in an Identity Store, and reports the results back to the Centralized Authentication System S2204. If each authentication server indicates a successful identification and satisfies the authentication policy, the Centralized Authentication Server grants a token which can be validated and may be translated into other token formats such as OAuth, SiteMinder or may be used as generated by the API Manager to provide access S2206. If any of the authentication serves fails to indicate a successful identification, thus failing the authentication policy, an appropriate failure message is displayed S2205.

Additional registrations may be implemented according to FIG. 8 as described previously.

Example 3

In a third exemplary embodiment a third party can utilize a Centralized Authentication System based on subscription model. With third party utilization, trust must be established so that third party user identity can be trusted. This may be done using public key infrastructure (PKI). For example, in an embodiment, a third party signs a user identity with their private key which the Centralized Authentication System validates using the public key during registration.

Figure 7:
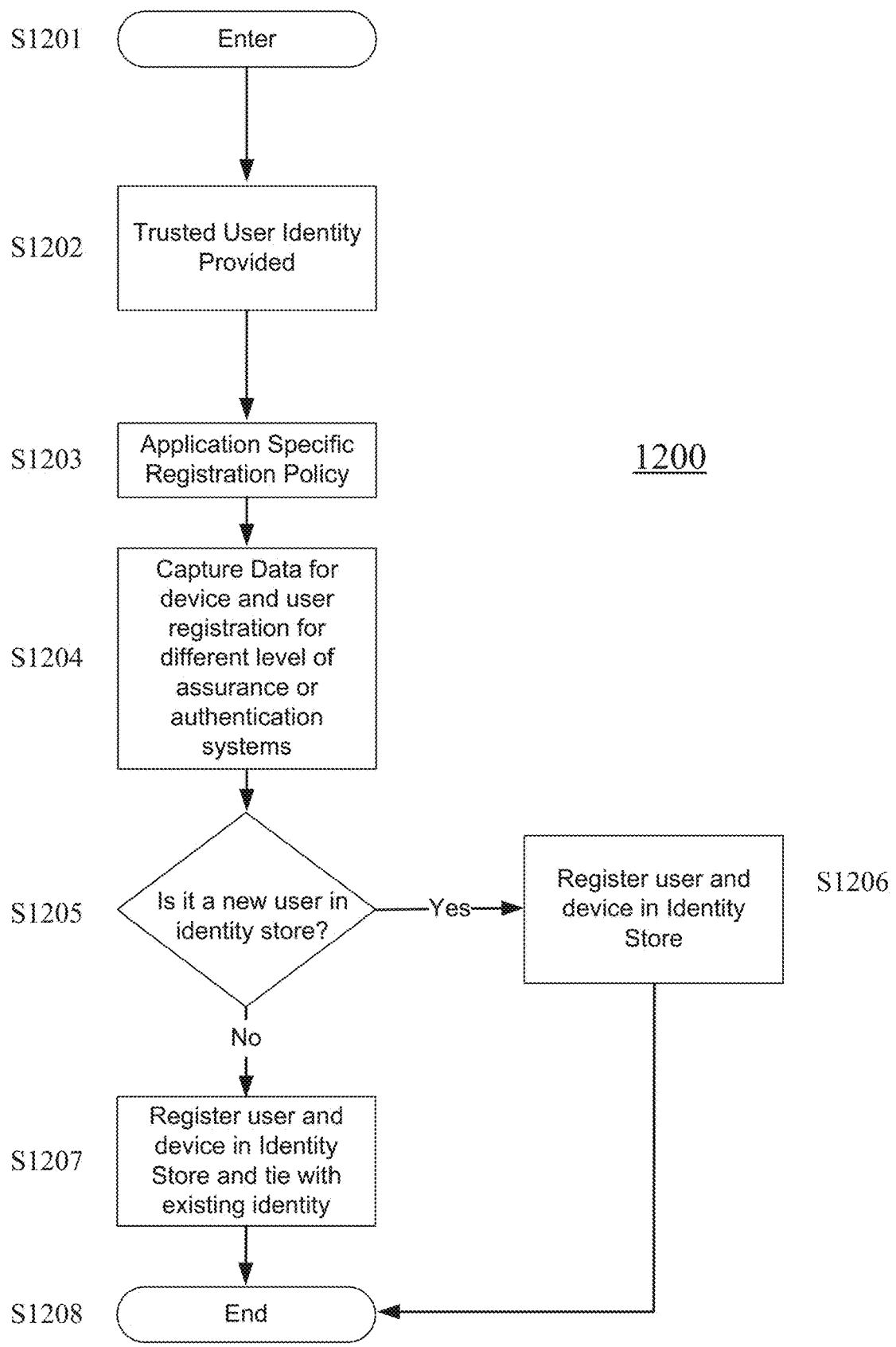
FIG. 7 illustrates a flowchart showing registration of a user and user device, in accordance with the third exemplary embodiment of the disclosure.

FIG. 7 provides a flowchart showing how the Object Data Structure can be used for registration of a user and/or user device in a third exemplary embodiment. The embodiment of the method illustrated in FIG. 7 comprises the following steps. Trusted User Identity is Provided S1202. Application Specific Registration Policy S1203. Capture Data for device and user registration for different level of assurance or authentication systems S1204. Determining whether it is a new user in identity store S1205. If yes, register user and device in Identity Store S1206. If no, register user and device in Identity Store and tie (i.e., associated) with existing identity S1207.

When a user seeks registration, the embodiment of the method starts with the provision of a trusted user identity S1202. When PM is used in the implementation of the third exemplary embodiment, a trusted user identity is a user identity signed by the private key of the third party. The user identity signed by the third party may be a user name, role, level of assurance, organization, or other form of user identification. Then, an application specific registration policy is implemented S1203. To capture data for device and user registration, the Centralized Authentication System calls the Capture Data Protocol and attempts to retrieve information within the Object Data Structure associated with the user S1204. Then it is determined whether the user is a new user in the Identity Store S1205. If so, the user and device are registered in the Identity Store S1206. If not, then the user and device in the Identity Store are registered and tied (i.e., associated with) with an existing identity in the Identity Store S1207.

Figure 12:
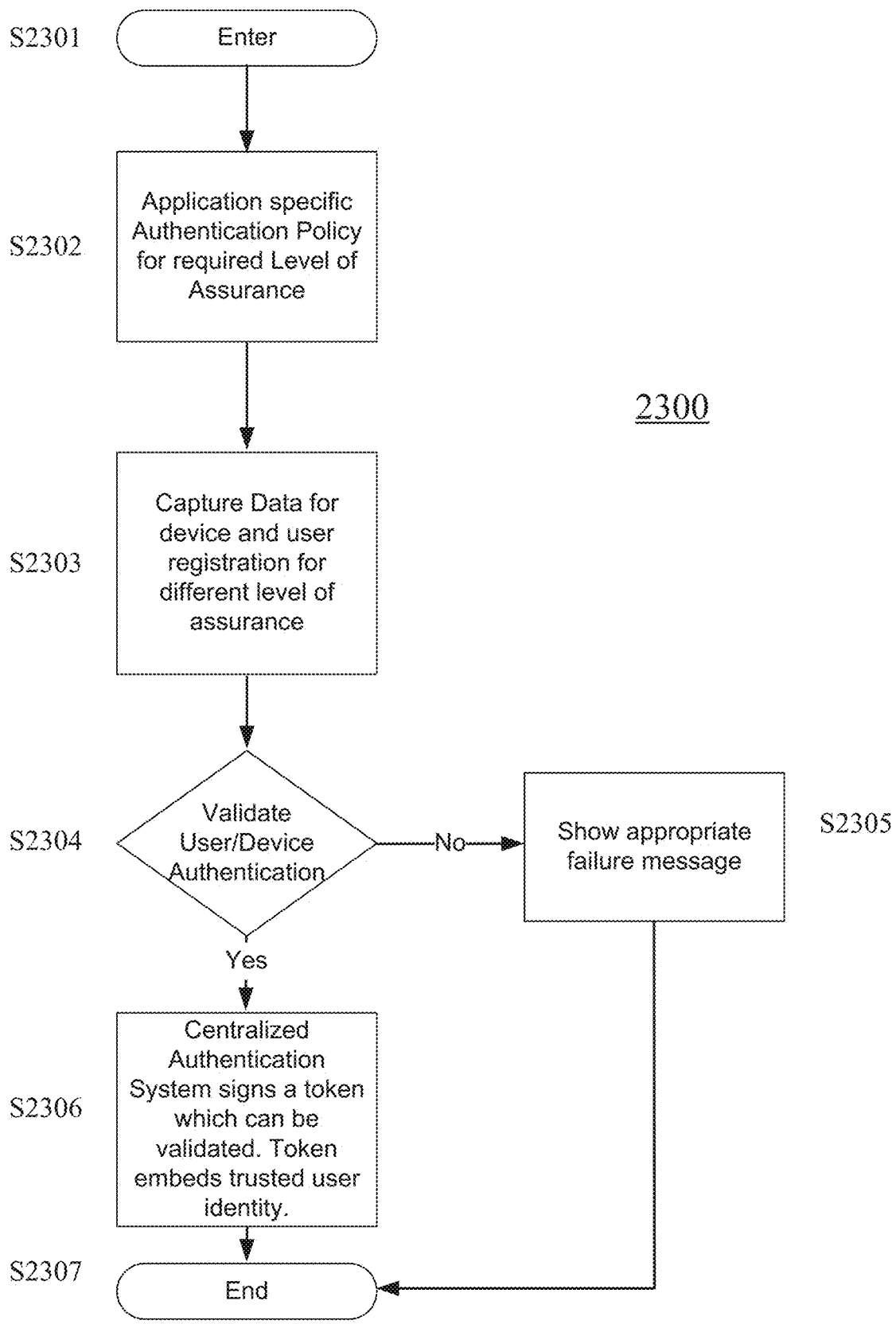
FIG. 12 is a flowchart showing authentication of a user and user device, in accordance with the third exemplary embodiment of the disclosure.

FIG. 12 provides a flowchart showing how the Object Data Structure can be used for authentication according to a first exemplary embodiment, as implemented in the network architecture shown in FIG. 3.

The embodiment of the method illustrated in FIG. 12 comprises the following steps. Application specific Authentication Policy for required Level of Assurance S2302. Capture Data for device and user registration for different level of assurance S2303. Validate User/Device Authentication S2304. If User/Device Authentication validation is unsuccessful, Show appropriate failure message 2305. If User/Device Authentication validation is successful, Centralized Authentication System signs a token which can be validated S2306. Token embeds trusted user identity S2207.

When a user seeks authorization access to a particular application, the application's Authorization Server routes the request to the Centralized Authentication System and an authentication policy to validate the user's credentials. The authentication policy dictates what types of authentication systems are acceptable for a successful authentication and can vary based on the desired level of assurance S2302. The Centralized Authentication System examines the Object Data Structure to determine user information and examines the headers of each set of user device and user authentication systems S2303.

The Centralized Authentication System then routes the user device authentication system data of each authentication system to a corresponding authentication server, as illustrated in FIG. 3. Each authentication server compares the data to data stored in an Identity Store, and reports the results back to the Centralized Authentication System S2304. If each authentication server indicates a successful identification and satisfies the authentication policy, the Centralized Authentication Server signs a token, which can be validated and embeds the trusted user identify S2306. When PM is used in the implementation of the third exemplary embodiment, the Centralized Authentication System may sign a token with its private key, which may be validated by entities possessing the corresponding public key. If any of the authentication serves fails to indicate a successful identification, thus failing the authentication policy, an appropriate failure message is displayed S2305.

Additional registrations may be implemented according to FIG. 8 as described previously.

Embodiments of the disclosure further describe a method and system for incorporating multiple authentication protocols in conjunction with client devices, where the multiple authentication protocols incorporate arbitrary interfaces. The system allows one or more authentication protocols to be utilized as a means for a client to be authenticated based on a desired assurance level regardless of an interface implementation provided to the client device by the vendor system supplying the authentication protocol.

Figure 13:
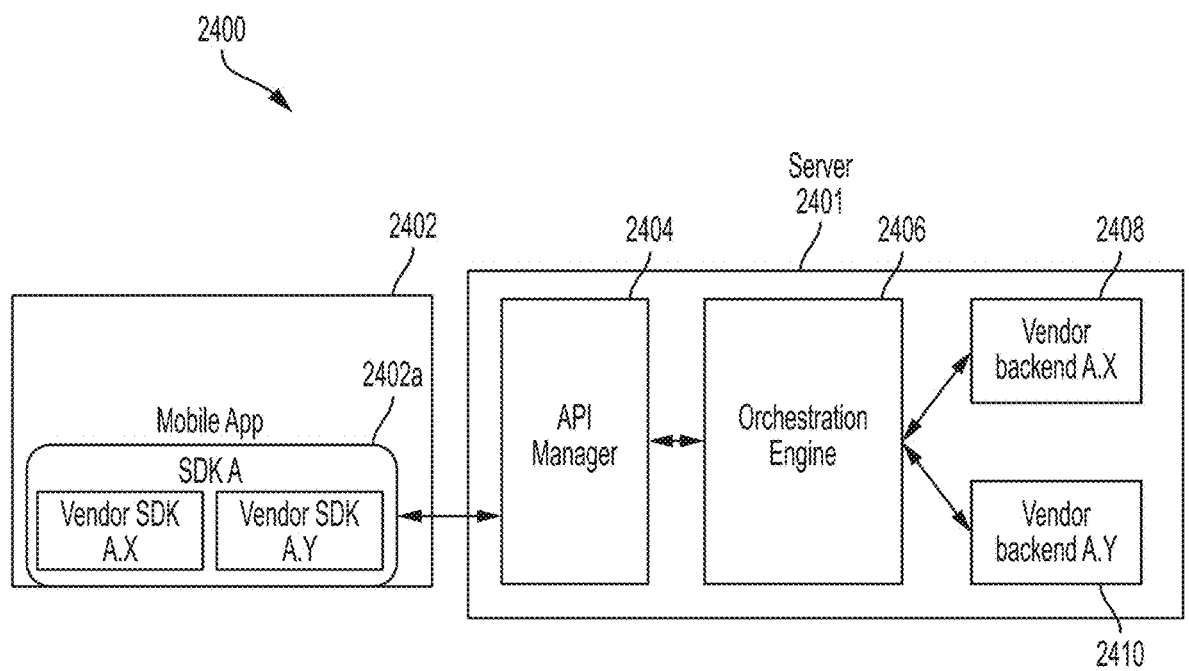
FIG. 13 schematically illustrates a client device integrating with an authentication system, in accordance with an embodiment of the disclosure.

FIGS. 13-17 illustrate exemplary embodiments of a network architecture utilizing a unified interface for providing a common interface within an authentication system for user devices utilizing arbitrary authentication vendors with varying interfaces. FIG. 13 illustrates an authentication system utilizing a unified interface 2400, this authentication system 2400 includes a user device 2402 in communication a server 2401 implementing an API Manager 2404, an Orchestration Engine 2406, a Vendor Backend A.X 2408 and a Vendor Backend A.Y 2410. In the illustrated embodiment, server 2401 is shown as a single server. However, in further embodiments, server 2401 may include multiple servers implementing various aspects of the API Manager 2404, the Orchestration Engine 2406, the Vendor Backend A.X 2408 and the Vendor Backend A.Y 2410.

As illustrated, the user device 2402 includes a mobile application 2402a that implements a software development kit (SDK) A that implements authentication services from the user device perspective. The authentication services are provided by various authentication vendor SKDs, such as Vendor SDK A.X and Vendor SDK A.Y. These authentication services must be able to interface with the application 2402a and thereby server 2401. However, there is no universal standard interface between these vendor SDKs and the application 2402a, which makes communication between the interface used at the user device 2402 and vendor SDK difficult. To enable more efficient communication between the vendor SDKs and the application 2402a, the vendor SKDs implement an abstract interface (see API structure 2500 of FIG. 14) that exposes their functionality to the SDK A at the application 2402a thereby forming a unified interface. At the user device 2402 end, the unified interface is implemented through the SDK A, within the application 2402a. The SDK A will accept data from the various vendor SDKs present and manipulate and construct that data into a form that is readable by the API Manager 2404 regardless of a specific interface utilized by the vendor SDK. Therefore, communication within the authentication system 2400 is streamlined over the unified interface.

The API Manager 2404 provides an Application Program Interface (API) management service. This service functions to manage a single programming interface that accepts data from the client device 2402. In certain embodiments, the API Manager 2404 accepts data from the client device 2402 and parses the data for information necessary for performing the desired function called for by a user of the authentication system 2400. Due to the manipulation and construction of the data at the application 2402a, the API Manager 2404 is able to understand what is being requested by the user and act accordingly. In this manner, the authentication system 2400 can accept data from a plurality of interfaces utilized by various types of vendor SDKs. In certain embodiments, the API Manager 2404 resides within the API/Resource Server 201 (see FIG. 1) or the API Manager 200 (see FIG. 2) or the Centralized Authentication System 300 (see FIG. 3).

The Orchestration Engine 2406 receives the data from the API Manager 2404 and configures it for use with various backend authentication vendor systems, such as Vendor Backend A.X 2408 and Vendor Backend A.Y 2410. In certain embodiments, the Orchestration Engine 2406 resides within the centralized authentication system server 300 (see FIG. 1), and the Vendor Backend A.X 2408 and Vendor Backend A.Y 2410 would independent reside within various authentication system servers, such as Authentication System 1 400 and Authentication System 2 500.

In the illustrated embodiment of FIG. 13, the API Manager 2404 and Orchestration Engine 2406 are shown as separate elements. In other embodiments, these are not separate elements. For instance, in certain embodiments, the API Manager 2404 and the Orchestration Engine 2406 are a single component.

Figure 14:
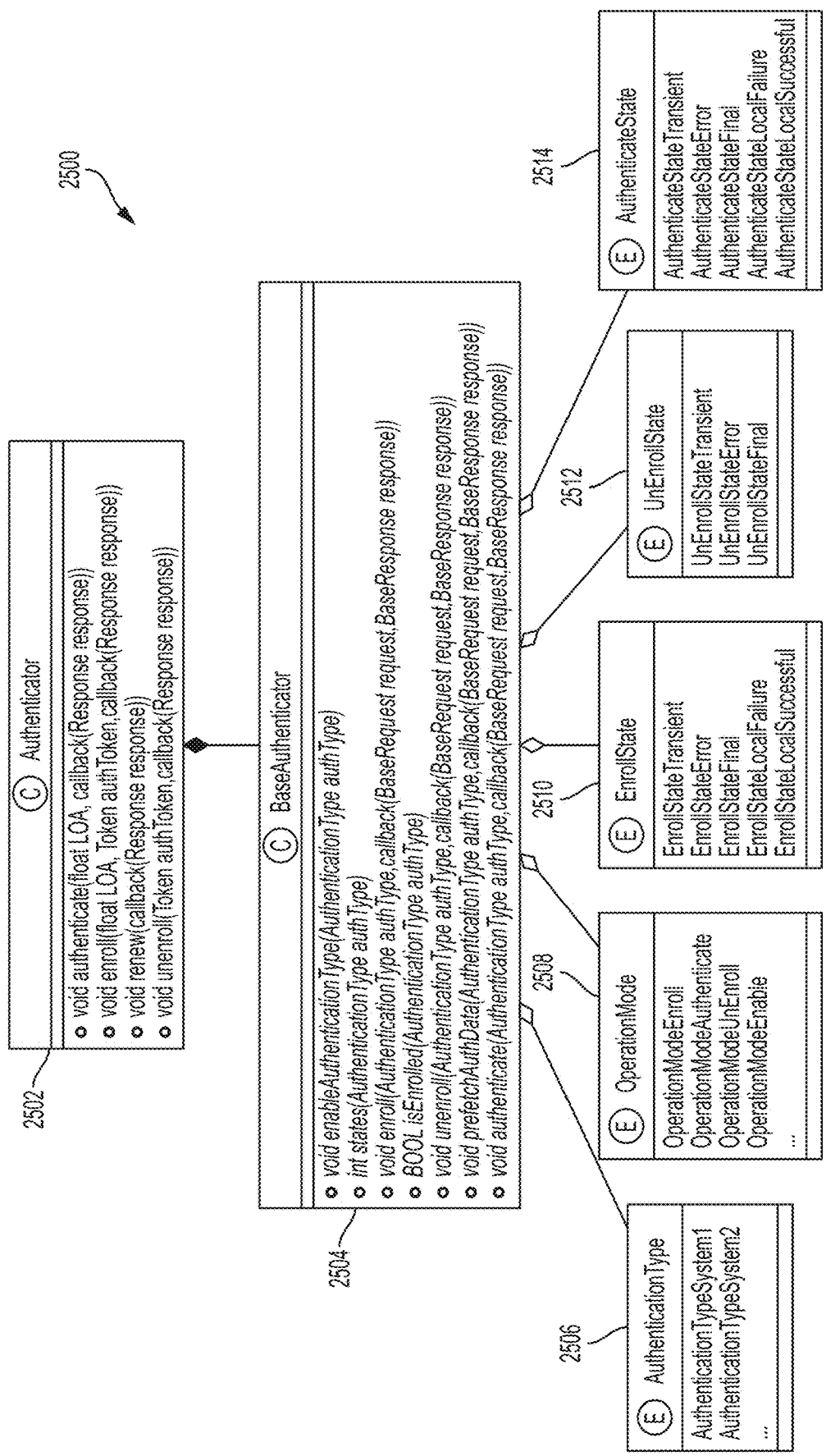
FIG. 14 illustrates a unified interface for an authentication system, in accordance with an embodiment of the disclosure.

FIG. 14 illustrates an API structure 2500, existing at the SDK A of the application 2402a (see FIG. 13), that enables the unified interface of the authentication system 2400 (see FIG. 13). In certain embodiments, vendors may implement API structure 2500 to create the abstract interface for streamlining communication between vendor SDKs (such as vendor SDK A.X and vendor SDK A.Y) and the application 2402a. As shown in the illustrated embodiment, the API 2500 includes an authenticator 2502 that provides the high level user service functions of "authenticate," "enroll," "renew," and "unenroll." The "authenticate" function accepts data from a user device for purposes of authenticating that device. The "enroll" function accepts data from a user device for the purpose of enrolling the user device within the system protected by the authentication system 2400. The "renew" function resets the user device's authentication, assuming the user device was previously authenticated. The "unenroll" function removes the user device's credentials from the authentication system 2400.

Underneath the authenticator 2502 is the base authenticator 2504 that implements the above listed functions of "authenticate," "enroll," "renew," and "unenroll." The base authenticator 2504 calls on sub-functions of AuthenticationType 2506, OperationMode 2508, EnrollState 2510, UnEnrollState 2512 and AuthenticateState 2514. In certain embodiments, the base authenticator 2504 implemented by the particular vendor utilizes the BaseRequest data field to pass data to the SDK A of the application 2402a.

To perform the functions of "authenticate," "enroll," "renew," and "unenroll" the base authenticator 2504 calls on one or more sub-functions. The AuthenticationType 2506 determines what authentication technique or method is being utilized by the user device 2402 and the authentication system 2400 (see FIG. 1). The OperationMode 2508 determines which of the "authenticate," "enroll," "renew," or "unenroll" functions is being requested. The EnrollState 2510 determines a state of an enrollment as one of a transient, error, final, local failure or a local success. The UnEnrollState 2512 determines a state of an unenrollment as one of transient, error or final. The AuthenticateState 2514 determines a state of an authentication as one of transient, error, final, local failure or a local success.

Figure 15:
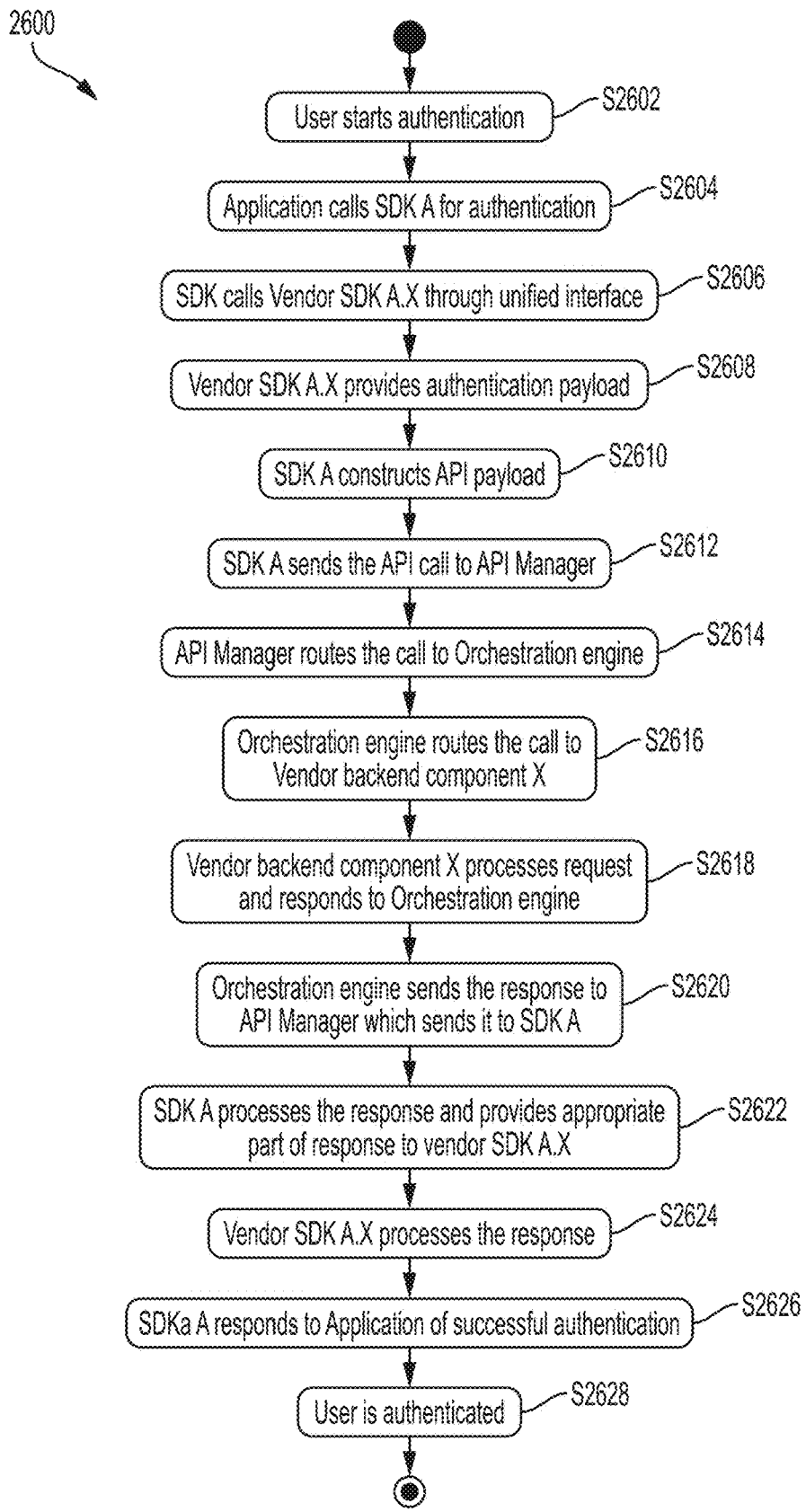
FIG. 15 illustrates a flowchart showing an authentication process with the authentication system utilizing a unified interface, in accordance with an embodiment of the disclosure.
Figure 16:
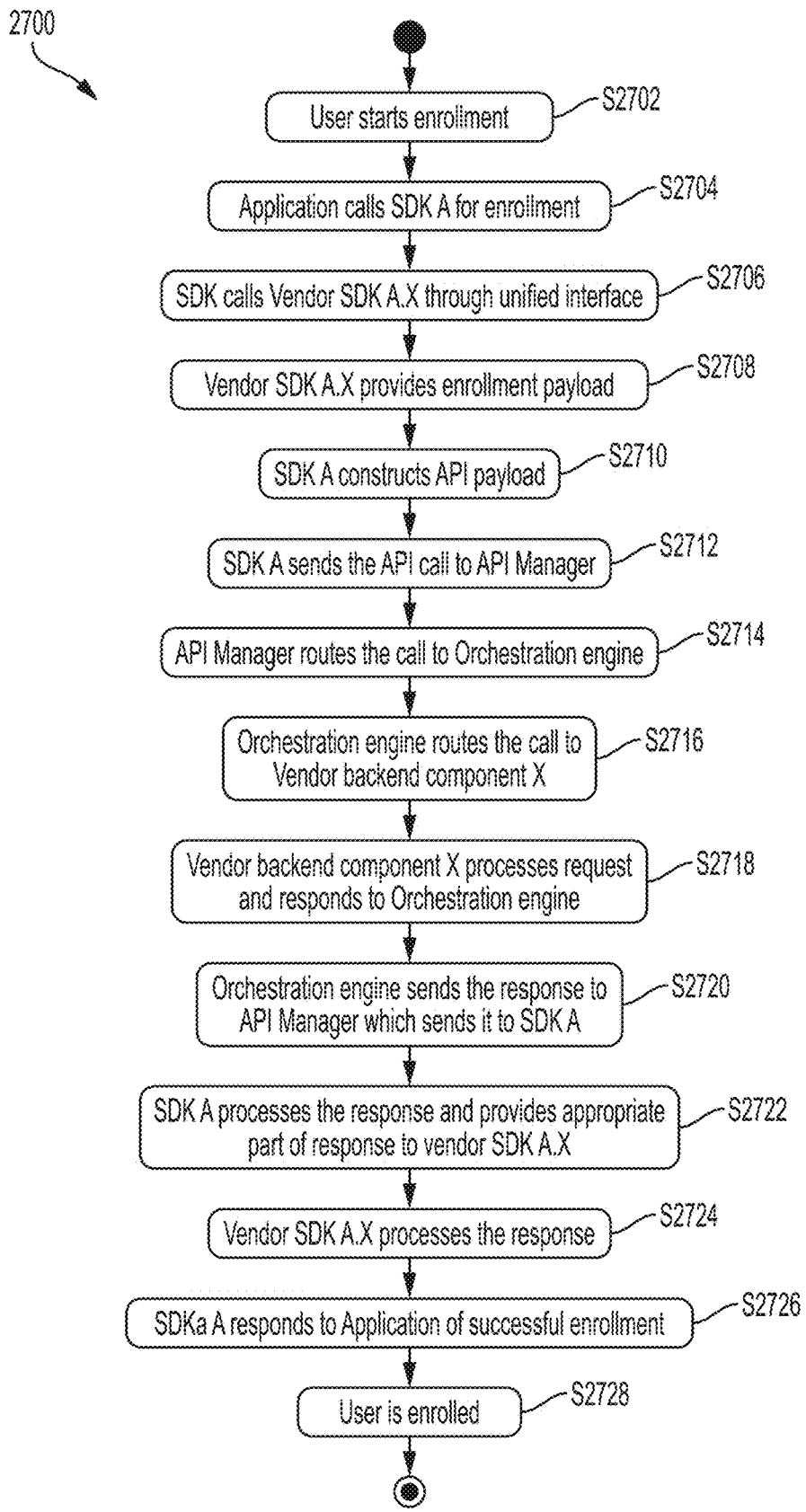
FIG. 16 illustrates a flowchart showing an enrollment with an authentication system using a unified interface, in accordance with an embodiment of the disclosure.
Figure 17:
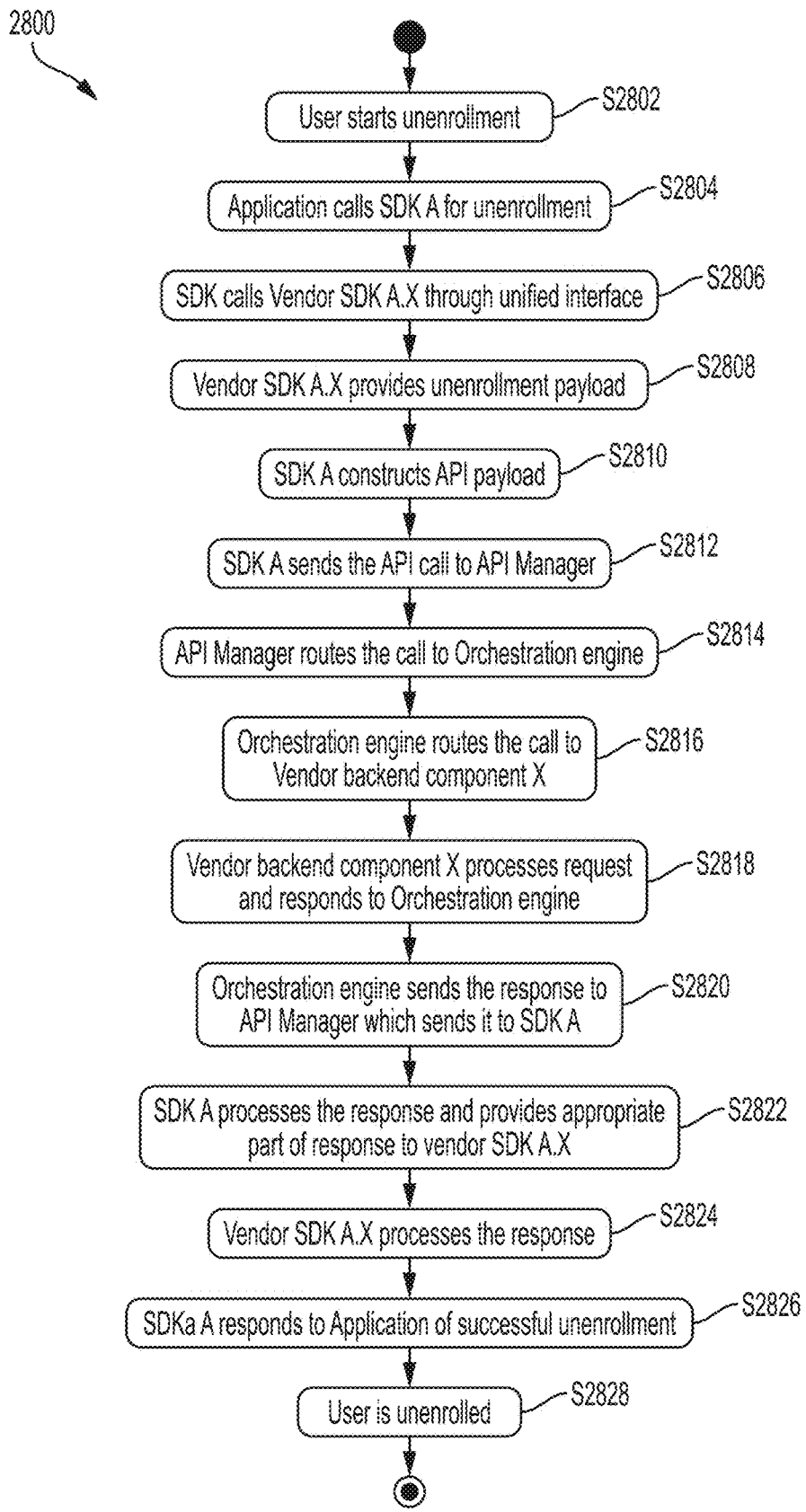
FIG. 17 illustrates a flowchart showing an unenrollment from an authentication system using a unified interface, in accordance with an embodiment of the disclosure.

FIGS. 15-17 illustrate flow charts providing steps for performing the above described functions of "authenticate," "enroll," and "unenroll." FIG. 15 provides a flow chart 2600 illustrating steps for performing the "authenticate" function. In the illustrated embodiment, at step 2602 a user initiates an authentication at the application 2402a (see FIG. 13) level, at the user device 2402. At step 2604, the application 2402a calls the SDK A for authentication. At step 2606, the SDK A calls the vendor SDK A.X through the unified interface of the authentication system 2400. In certain embodiments, this is accomplished by the SDK A calling the authenticate function through the particular vendor's implementation of the base authenticator 2504 (see FIG. 14). At step 2608, the vendor SDK A.X provides the authentication payload data, including the data required for authenticating the user device 2402, to the SDK A. At step 2610, the SDK A constructs the authentication payload data into API payload data. At step 2612, the SDK A sends the API payload data to the API Manager 2404. At step 2614, the API Manager 2404 routes the data to the orchestration engine 2406. At step 2616, the orchestration engine 2406 routes the data to the vendor backend system relevant to the particular type of authentication data from the user device 2402, such as vendor backend A.X. At step 2618, the vendor backend A.X processes the data and responds to the orchestration engine 2406. At step 2620, the orchestration engine 2406 sends the response from the vendor backend A.X to the API Manager 2404, which in turn sends it to the SDK A at the user device 2402. At step 2622, the SDK A processes the response and provides that response to the vendor SDK A.X. At step 2624, the vendor SDK A.X processes the response. At step 2626, the SDK A responds to the application 2402a regarding an outcome of the authentication, such as it being successful, and at step 2628, the user is authenticated.

FIG. 16 provides a flow chart 2700 illustrating steps for performing the "enroll" function. At step 2702, the user initiates the enrollment function at the application 2402a (see FIG. 13) level, at the user device 2402. At step 2704, the application 2402a calls the SDK A for enrollment. At step 2706, the SDK A calls the vendor SDK A.X through the unified interface of the authentication system 2400. In certain embodiments, this is accomplished by the SDK A calling the enroll function through the particular vendor's implementation of the base authenticator 2504 (see FIG. 14). At step 2708, the vendor SDK A.X provides enrollment payload data, including data required for enrolling the user device 2402, with the authentication system 2400, to the SDK A. At step 2710, the SDK A constructs the enrollment payload data into API payload data. At step 2712, the SDK A sends the API payload data to the API Manager 2404. At step 2714, the API Manager 2404 routes the data to the orchestration engine 2406. At step 2716, the orchestration engine 2406 routes the data to the vendor backend system relevant to the particular type of enrollment data from the user device 2402, such as vendor backend A.X. At step 2718, the vendor backend A.X processes the data and responds to the orchestration engine 2406. At step 2720, the orchestration engine 2406 sends the response from the vendor backend A.X to the API Manager 2404, which in turn sends it to the SDK A at the user device 2402. At step 2722, the SDK A processes the response and provides that response to the vendor SDK A.X. At step 2724, the vendor SDK A.X processes the response. At step 2726, the SDK A responds to the application 2402*a* regarding an outcome of the enrollment, such as it being successful, and at step 2728, the user is enrolled.

FIG. 17 provides a flow chart 2800 illustrating steps for performing the "unenroll" function. At step 2802, the user initiates the unenrollment function at the application 2402*a* (see FIG. 13) level, at the user device 2402. At step 2804, the application 2402*a* calls the SDK A for unenrollment. At step 2806, the SDK A calls the vendor SDK A.X through the unified interface of the authentication system 2400. In certain embodiments, this is accomplished by the SDK A calling the unenroll function through the particular vendor's implementation of the base authenticator 2504 (see FIG. 14). At step 2808, the vendor SDK A.X provides unenrollment payload data, including data required for unenrolling the user device 2402, with the authentication system 2400, to the SDK A. At step 2810, the SDK A constructs the unenrollment payload data into API payload data. At step 2812, the SDK A sends the API payload data to the API Manager 2404. At step 2814, the API Manager 2404 routes the data to the orchestration engine 2406. At step 2816, the orchestration engine 2406 routes the data to the vendor backend system relevant to the particular type of unenrollment data from the user device 2402, such as vendor backend A.X. At step 2818, the vendor backend A.X processes the data and responds to the orchestration engine 2406. At step 2820, the orchestration engine 2406 sends the response from the vendor backend A.X to the API Manager 2404, which in turn sends it to the SDK A at the user device 2402. At step 2822, the SDK A processes the response and provides that response to the vendor SDK A.X. At step 2824, the vendor SDK A.X processes the response. At step 2826, the SDK A responds to the application 2402*a* regarding an outcome of the unenrollment, such as it being successful, and at step 2828, the user is unenrolled.

Figure 18:
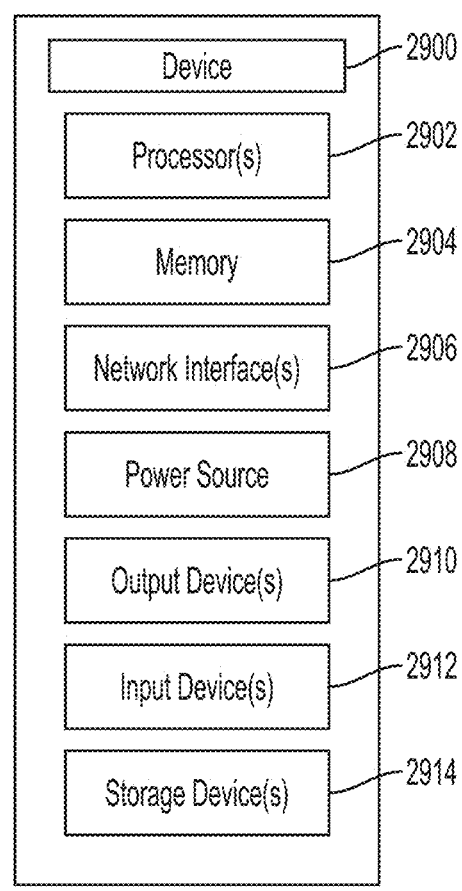
FIG. 18 provides an electronic device according to an embodiment of the disclosure.

FIG. 18 illustrates an electronic device 2900 according to an embodiment of the disclosure. Electronic devices, for example, servers, such as server 2401, and terminals, such as user device 2402, may be computer devices as shown in FIG. 18. The device 2900 may include one or more processors 2902, memory 2904, network interfaces 2906, power source 2908, output devices 2910, input devices 2912, and storage devices 2914. Although not explicitly shown in FIG. 18, each component provided is interconnected physically, communicatively, and/or operatively for inter-component communications in order to realize functionality ascribed to the various entities identified in FIGS. 1-3 and 13. To simplify the discussion, the singular form will be used for all components identified in FIG. 18 when appropriate, but the use of the singular does not limit the discussion to only one of each component. For example, multiple processors may implement functionality attributed to processor 2902.

Processor 2902 is configured to implement functions and/or process instructions for execution within device 2900. For example, processor 2902 executes instructions stored in memory 2904 or instructions stored on a storage device 2914. In certain embodiments, instructions stored on storage device 2914 are transferred to memory 2904 for execution at processor 2902. Memory 2904, which may be a non-transient, computer-readable storage medium, is configured to store information within device 2900 during operation. In some embodiments, memory 2904 includes a temporary memory that does not retain information stored when the device 2900 is turned off. Examples of such temporary memory include volatile memories such as random access memories (RAM), dynamic random access memories (DRAM), and static random access memories (SRAM). Memory 2904 also maintains program instructions for execution by the processor 2902 and serves as a conduit for other storage devices (internal or external) coupled to device 2900 to gain access to processor 2902.

Storage device 2914 includes one or more non-transient computer-readable storage media. Storage device 2914 is provided to store larger amounts of information than memory 2904, and in some instances, configured for long-term storage of information. In some embodiments, the storage device 2914 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 2906 are used to communicate with external devices and/or servers. The device 2900 may comprise multiple network interfaces 2906 to facilitate communication via multiple types of networks. Network interfaces 2906 may comprise network interface cards, such as Ethernet cards, optical transceivers, radio frequency transceivers, or any other type of device that can send and receive information. Non-limiting examples of network interfaces 2906 include radios compatible with several Wi-Fi standards, 3G, 4G, Long-Term Evolution (LTE), Bluetooth®, etc.

Power source 2908 provides power to device 2900. For example, device 2900 may be battery powered through rechargeable or non-rechargeable batteries utilizing nickel-cadmium or other suitable material. Power source 2908 may include a regulator for regulating power from the power grid in the case of a device plugged into a wall outlet, and in some devices, power source 2908 may utilize energy scavenging of ubiquitous radio frequency (RF) signals to provide power to device 2900.

Device 2900 may also be equipped with one or more output devices 2910. Output device 2910 is configured to provide output to a user using tactile, audio, and/or video information. Examples of output device 2910 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user.

Device 2900 is equipped with one or more input devices 2912. Input devices 2912 are configured to receive input from a user or the environment where device 2900 resides. In certain instances, input devices 2912 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for device 2900 are functionally and communicatively coupled to achieve certain behaviors. In some embodiments, these behaviors are controlled by software running on an operating system of device 2900.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate and intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A user device communicatively coupled to a server providing remote user service functions, the user device comprising:
   an input device for providing user data to the user device;
   a processor; and
   a memory storing instructions that when executed configure the processor to:
   initiate a user service function;
   call an application Software Development Kit (SDK) configured to perform the user service function;
   call a vendor SDK implementing an authentication protocol from the application SDK over a unified interface formed between the vendor SDK and the application SDK, wherein the unified interface is formed by the vendor SDK implementing an abstract interface that exposes the functionality of the vendor SDK to the application SDK, and wherein the unified interface integrates the application SDK with multiple vendor SDKs by forming vendor SDK data from the multiple vendor SDKs into a common data format, and wherein the abstract interface of the vendor SDK is different from a specific interface utilized by the vendor SDK;
   receive vendor data related to the user service function from the vendor SDK at the application SDK over the unified interface;
   construct, by the unified interface of the application SDK, the vendor data into application data in the common data format that is relevant to the user service function and readable by an Application Programming interface (API) at the server; and
   send the application data to the server.

2. The user device of claim 1, wherein the memory stores further instructions that when executed configure the processor to:
   receive, from the server, response data to the user service function based on the application data sent to the server;
   process the response data by the application SDK to convert the response data into a format readable by the vendor SDK;
   provide the converted response data to the vendor SDK; and
   receive an outcome response to the user service function from the vendor SDK.

3. The user device of claim 1, wherein the unified interface is a common communication interface between an interface of the application SDK and a plurality of vendor SDK interfaces.

4. The user device of claim 3, where the interface of the application SDK and the plurality of vendor SDK interfaces are different interfaces.

5. The user device of claim 1, wherein the user service function is one of:
   a user authentication function, a user enrollment function, and a user unenrollment function.

6. The user device of claim 1, wherein the server implements more than one backend authentication vendor system.

7. A method of performing user service functions at a user device communicatively coupled to a server providing the user service functions, the method comprising:
   initiating a user service function;
   calling an application Software Development Kit (SDK) configured to perform the user service function;
   calling a vendor SDK implementing an authentication protocol from the application SDK over a unified interface formed between the vendor SDK and the application SDK, wherein the unified interface is formed by the vendor SDK implementing an abstract interface that exposes the functionality of the vendor SDK to the application SDK, and wherein the unified interface integrates the application SDK with multiple vendor SDKs by forming vendor SDK data from the multiple vendor SDKs into a common data format, and wherein the abstract interface of the vendor SDK is different from a specific interface utilized by the vendor SDK;
   receiving vendor data related to the user service function from the vendor SDK at the application SDK over the unified interface;
   constructing, by the unified interface of the application SDK, the vendor data into application data in the common data format that is relevant to the user service function and readable by an Application Programming Interface (API) at the server; and
   sending the application data to the server.

8. The method of claim 7, further comprising:
   receiving, from the server, response data to the user service function based on the application data sent to the server;
   processing the response data by the application SDK to convert the response data into a format readable by the vendor SDK;
   providing the converted response data to the vendor SDK; and receiving an outcome response to the user service function from the vendor SDK.

9. The user device of claim 7, wherein the unified interface is a common communication interface between an interface of the application SDK and a plurality of vendor SDK interfaces.

10. The user device of claim 9, where the interface of the application SDK and the plurality of vendor SDK interfaces are different interfaces.

11. The user device of claim 7, wherein the user service function is one of:
a user authentication function, a user enrollment function, and a user unenrollment function.

12. The method of claim 7, wherein the server implements more than one backend authentication vendor system.

13. The method of claim 12, where the more than one backend authentication vendor system comprises two or more of: a voice recognition system, a facial recognition system, a fingerprint identification system, a retinal pattern identification system, a universal serial bus (USB) security token, a near field communication (NFC) identification system, and a Fast Identity Online (FIDO) Alliance specification identification system.

14. A server system for performing user service functions at a user device communicatively coupled to a server providing the user service functions, the system comprising:
a memory storing instructions of an application, the application communicatively coupling the user device and the server, wherein the instructions of the application configure a processor of the user device to:
initiate a user service function;
call an application Software Development Kit (SDK) configured to perform the user service function;
call a vendor SDK implementing an authentication protocol from the application SDK over a unified interface formed between the vendor SDK and the application SDK, wherein the unified interface is formed by the vendor SDK implementing an abstract interface that exposes the functionality of the vendor SDK to the application SDK, and wherein the unified interface integrates the application SDK with multiple vendor SDKs by forming vendor SDK data from the multiple vendor SDKs into a common data format, and wherein the abstract interface of the vendor SDK is different from a specific interface utilized by the vendor SDK;
receive vendor data related to the user service function from the vendor SDK at the application SDK over the unified interface;
construct, by the unified interface of the application SDK, the vendor data into application data in the common data format that is relevant to the user service function and readable by an Application Programming Interface (API) at the server; and
send the application data to the server.

15. The server system of claim 14, wherein the instructions of the application further configure the processor of the user device to:
receive, from the server, response data to the user service function based on the application data sent to the server;
process the response data by the application SDK to convert the response data into a format readable by the vendor SDK;
provide the converted response data to the vendor SDK; and
receive an outcome response to the user service function from the vendor SDK.

16. The server system of claim 14, wherein the unified interface is a common communication interface between an interface of the application SDK and a plurality of vendor SDK interfaces.

17. The server system of claim 16, where the interface of the application SDK and the plurality of vendor SDK interfaces are different interfaces.

18. The server system of claim 14, wherein the user service function is one of: a user authentication function, a user enrollment function, and a user unenrollment function.

19. The server system of claim 14, wherein the server implements more than one backend authentication vendor system.

20. The server system of claim 19, where the more than one backend authentication vendor system comprises two or more of: a voice recognition system, a facial recognition system, a fingerprint identification system, a retinal pattern identification system, a universal serial bus (USB) security token, a near field communication (NFC) identification system, and a Fast Identity Online (FIDO) Alliance specification identification system.

* * * * *